(12) United States Patent
Aggarwal et al.

(10) Patent No.: US 10,057,308 B2
(45) Date of Patent: Aug. 21, 2018

(54) CUSTOMIZABLE REPRODUCTION OF ELECTRONIC MEETINGS

(71) Applicant: Adobe Systems Incorporated, San Jose, CA (US)

(72) Inventors: Anurag Aggarwal, Noida (IN); Mukul, Indirapuram (IN); Ajay Jain, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 339 days.

(21) Appl. No.: 14/701,297

(22) Filed: Apr. 30, 2015

(65) Prior Publication Data
US 2016/0323333 A1 Nov. 3, 2016

(51) Int. Cl.
*H04L 29/06* (2006.01)
*G11B 27/00* (2006.01)
*H04L 29/08* (2006.01)
*H04W 4/08* (2009.01)

(52) U.S. Cl.
CPC .......... *H04L 65/4038* (2013.01); *G11B 27/00* (2013.01); *H04L 67/02* (2013.01); *H04L 67/06* (2013.01); *H04W 4/08* (2013.01)

(58) Field of Classification Search
CPC ...... H04L 65/4038; H04L 67/02; H04L 67/06
USPC ........................................................ 709/204
See application file for complete search history.

(56) References Cited

U.S. PATENT DOCUMENTS

| | | | |
|---|---|---|---|
| 9,674,243 B2* | 6/2017 | Bader-Natal ............. | H04N 7/15 |
| 2014/0229866 A1* | 8/2014 | Gottlieb ................ | H04L 65/403 |
| | | | 715/758 |
| 2015/0181020 A1* | 6/2015 | Fitzsimmons .... | H04M 3/42221 |
| | | | 379/67.1 |
| 2016/0170617 A1* | 6/2016 | Shi ........................ | G06F 3/0484 |
| | | | 345/668 |

OTHER PUBLICATIONS

Laker, Convert and Edit Microsoft Office Live Meeting Recordings, Mar. 20, 2015, TechNet Wiki, Revision 2 (4 pages).*
Benjamin, How to Record a Podcast with People in Multiple Locations, Oct. 11, 2008, hivelogic.com (3 pages).*

* cited by examiner

*Primary Examiner* — Wing F Chan
*Assistant Examiner* — Leon Y Tseng
(74) *Attorney, Agent, or Firm* — Wolfe-SBMC

(57) ABSTRACT

Customizable reproduction of electronic meetings is described. In one or more embodiments, content, such as slides or audio or chat, is obtained from multiple participants of an electronic meeting, such as a web conference. Obtained content is channelized by associating a unique identifier with content based at least partially on which participant contributed the content. Content events may be associated with a time stamp that is derived from a time index of the electronic meeting. Content may be contributed by a presenter participant or a non-presenter participant. To customize reproduction of an electronic meeting, a host may be empowered to select content by designating specific participants for inclusion or exclusion in the reproduction. A user interface may graphically indicate types or time slots of content contributed by individual participants. A host may designate individual content events for inclusion or exclusion by selection or non-selection of displayed time slots.

20 Claims, 13 Drawing Sheets

| | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 | 75 |
|---|---|---|---|---|---|---|---|---|---|---|---|---|---|---|---|---|---|---|---|---|---|---|---|---|---|
| (Presenter) Participant #1 | P | P | P | P | P | P | P | P | P | P | P | P | P | P | P | P | P | P | P | P | P | P | P | P | P |
| Participant #2 | A | | | | | | | | | | | | | | | | | | | | | | | | |
| Participant #3 | A | A | | | | | | A | A | C | | | | | A | A | | | C | C | | | | | A |
| Participant #4 | A | | | | A | | | | | C | | | | | | | | | C | C | | | | | |
| Participant #5 | | | | | | | | | | | | | | | | | | | | A | A | | | | A |
| Participant #6 | | | | | | | | | A | A | | | | | A | | | | | | A | | | | A |
| Participant #7 | A | | | | | | | | A | C | | | | | A | | | | | | A | A | | | A |
| Participant #8 | A | | | | | | | | | C | | | | | A | | | | | | A | | | | A |
| Participant #9 | | | | | A | | | | | | | | | | | | | | | | | | | | |

Time Index:

| (Presenter) Participant #1 | P | P | P | P | P | P | P | P | P | P | P | P | P | P | P | P | P | P | P | P | P | P | P | P | P |
|---|---|---|---|---|---|---|---|---|---|---|---|---|---|---|---|---|---|---|---|---|---|---|---|---|---|
| Time Index: | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 | 75 |

| Participant #2 | A | | | | | | | | | | | | | | | | | | | | | | | | |
|---|---|---|---|---|---|---|---|---|---|---|---|---|---|---|---|---|---|---|---|---|---|---|---|---|---|
| Time Index: | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 | 75 |

| Participant #3 | A | | | | | | | A | A | C | | | | | A | A | | | C | C | | | | | A |
|---|---|---|---|---|---|---|---|---|---|---|---|---|---|---|---|---|---|---|---|---|---|---|---|---|---|
| Time Index: | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 | 75 |

. . .

| Participant #7 | A | | | | | | | | | C | | | | | A | | | | | | | | | | A |
|---|---|---|---|---|---|---|---|---|---|---|---|---|---|---|---|---|---|---|---|---|---|---|---|---|---|
| Time Index: | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 | 75 |

CUSTOMIZABLE REPRODUCTION OF ELECTRONIC MEETINGS

BACKGROUND

Web conferences utilize the internet to enable audio or video conferences to be conducted between two or more people. Using a link that was provided in an email, for example, a participant may join a web conference via a web browser or via a browser plug-in or an ancillary application. A presenting participant typically displays slides and accompanies the slides with speech that is delivered via a web interface or a telecommunications pathway, such as a teleconference bridge. During a web conference, non-presenting participants may be empowered to actively participate by making speech or chat contributions. Some web conference services enable the web conference to be recorded and subsequently replayed so that a person may experience each aspect of the web conference after the conference is originally conducted.

SUMMARY

For one or more example embodiments, a device includes one or more processors and a computer-readable storage medium having stored thereon multiple instructions that, responsive to execution by the one or more processors, cause the one or more processors to perform a number of operations. Content is received from multiple participants during an electronic meeting. First content received from a first participant during the electronic meeting is identified. Second content received from a second participant during the electronic meeting is identified. A user interface is presented to an end-user to enable customized reproduction of the electronic meeting. One or more designations indicative of selection of a first portion of the first content received from the first participant and indicative of non-selection of a second portion of the second content received from the second participant are received. A customized reproduction of the electronic meeting that includes the first portion of the first content and that excludes the second portion of the second content is generated.

For one or more example embodiments, multiple participants that have joined an electronic meeting are detected. Respective channels are assigned to respective ones of the multiple participants, and content from the multiple participants is obtained during the electronic meeting. The content from the multiple participants is processed at least partially based on the respective channels to enable customizable reproduction of the electronic meeting with content that is responsive to a designated participant of the multiple participants.

For one or more example embodiments, a device includes an electronic meeting module that is configured to perform a number of operations. A user interface is presented that enables an end user to customize reproduction of an electronic meeting by selectively including content provided by at least one designated participant of multiple participants. An indication of the at least one designated participant is obtained from the end user. Electronic meeting content is sliced to enable extraction of the content provided by the at least one designated participant.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit or two digits of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIGS. 5 and 6 depict electronic meeting content that has been processed in accordance with one or more example embodiments.

DETAILED DESCRIPTION

Overview

Figure 1:
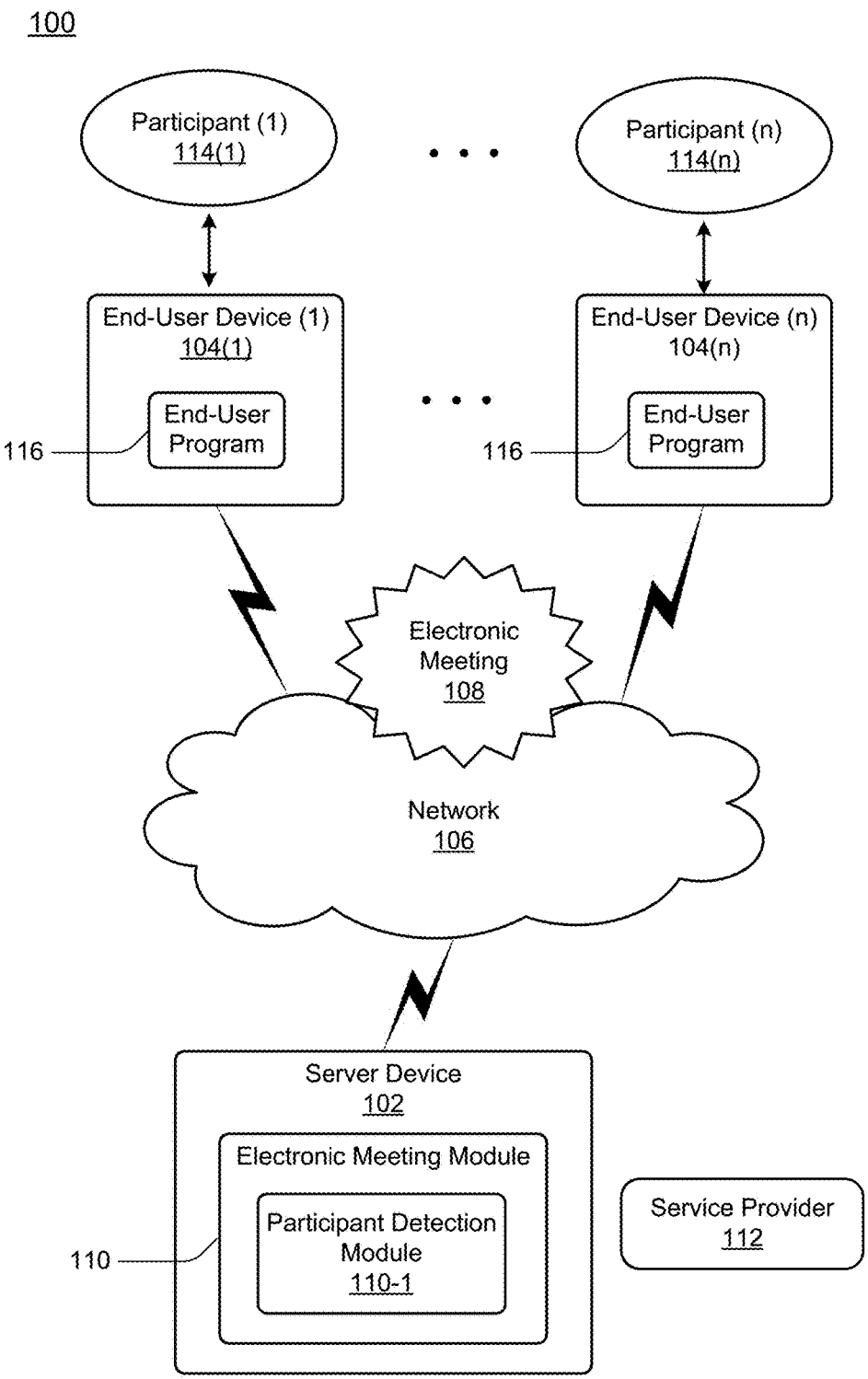
FIG. 1 is an illustration of an environment of an example embodiment that is operable to employ techniques described herein that relate to an electronic meeting.

Web conferences, or more generally electronic meetings, may be conducted between or among two, three, or more participants. At times, a person who intended to participate in a scheduled electronic meeting may miss the meeting, and that person may wish to observe it afterwards. Alternatively, sometimes an electronic meeting is conducted as a training experience, such as a training seminar, with an expectation that the training seminar will subsequently be available for observance as part of ongoing training opportunities. Regardless of reason or motivation, it may be desirable for an electronic meeting to be replayed after it is first conducted.

During an electronic meeting, many participants may produce background sounds or conversation, interrupt a presenter, interject questions or comments, and so forth. In other words, at the beginning, during the middle, or at the end of an electronic meeting, non-presenter participants may add noise to an electronic meeting. Consequently, although a presenter participant may deliver an amazing conference session in accordance with identified goals, unplanned or undesired interruptions that are introduced by other participants may add significant noise to the session as originally planned or intended. Furthermore, a subsequent person, who is attempting to observe a recording of an electronic meeting, may experience difficulty trying to quickly locate, follow, or attend to only content from a specific participant, such as a presenter participant or any other specific participant, while avoiding content that is contributed by other participants of the electronic meeting.

Examples of noise that may potentially be introduced by participants of an electronic meeting, such as a training seminar, include the following. First, before a presenter participant arrives or formally starts a training seminar, attendee participants that join early may talk to each other as they "arrive" at the virtual meeting space—such as by exchanging personal greetings or engaging in small talk—and therefore add content that is not related to the agenda of the training seminar. This unrelated content, or noise, may continue until the presenter participant arrives or formally asks for silence to start the training. Second, participants may periodically submit questions via speech or chat, which questions may be good or bad, and even if good may be ill-timed. For instance, a training seminar may be interrupted by a relevant question, but a presenter participant had anticipated the question and would have addressed it later at a more appropriate point of the training seminar. Third, non-presenter participants may communicate with a presenter participant via a chat mode during a training seminar. Chat submissions may introduce additional communicative noise and yet also provide an opportunity to subsequently enhance a training seminar. For instance, comments and questions from participants, especially but not solely written ones, may be used to generate a set of frequently asked questions (FAQ), and the FAQ may be available as part of a training seminar reproduction or used separately therefrom.

Hence, although a presenter participant may have a definite pattern or a defined flow in mind for an electronic meeting, and the presenter participant may have actually orchestrated a presentation in accordance with the definite pattern or defined flow to an extent planned content was in fact presented, unplanned interruptions or noise events that are added by non-presenter participants may nevertheless have disturbed and negatively impacted the actual electronic meeting as experienced by the participants. Consequently, instead of being able to reuse an electronic meeting, such as a training seminar, for the benefit of future observer trainees, a presenter trainer may be obligated to repeat the training session for each new batch of trainees. Moreover, if an electronic meeting is recorded only as a monolithic unit that memorializes each and every event without differentiation or capacity for separation, a person who is observing a recording of the electronic meeting will find it difficult to determine when a presenter arrives, to identify precise locations when relevant content is presented, to avoid interjected noises, to key into content provided by desired non-presenter participants, and so forth.

On the other hand, utilization of the techniques described herein enables a host or presenter participant to reuse original content for future observances and thereby save time and effort that would be expended by conducting an electronic meeting again. In accordance with certain example embodiments, a host or presenter participant is empowered to bring back or restore a completed electronic meeting to an original state as planned or expected by the presenter participant. For example, noise, comments, questions, etc. that were added to an electronic meeting may be decoupled from core or original content. Decoupled noise, such as comments or interactive chats, may be made available for further data processing or sharing with relevant interested parties. Additionally or alternatively, an example system as described herein may enable an observer, who intends to play back a recording of an electronic meeting, to locate or follow content of at least one specific designated participant, such as a presenter participant or a non-presenter participant, while excluding content from one or more non-designated participants.

For certain example embodiments, respective participants of an electronic meeting are assigned respective channels. Content, such as audio or chat submissions during an electronic meeting, that is received from or contributed by a given participant is funneled to a channel that is associated with the given participant. By way of example only, a participant or a channel associated therewith may correspond to a unique identifier. Content that is obtained during the electronic meeting is tagged or otherwise associated with the unique identifier that corresponds to a participant that contributed the content. Content obtained during an electronic meeting may therefore be sliced into channels on a per-participant basis. Obtained content may also be associated with a time stamp that indicates an elapsed time at which the content was contributed by a given participant or a time at which the content may be presented as part of a customized reproduction of an electronic meeting.

To enable an end-user, such as a host or a presenter participant or a person that wishes to observe a reproduction of an electronic meeting, to customize a reproduction of the electronic meeting, a user interface may be presented. Based on unique identifiers associated with obtained content, a user interface may be generated that depicts multiple participants in conjunction with visual representations of content that each participant contributed. The visual representations of contributed content may indicate a content type, such as audio, chat, video or screen image. The content representations may be depicted based on time stamps associated with the content and with regard to an elapsed time of the electronic meeting that is displayed as part of the user interface. The end-user may be empowered to designate individual participants to have their contributed content included or excluded using the user interface. By selecting or de-selecting particular visual representations of content or specific time ranges of an electronic meeting's displayed elapsed time, particular content events of a given participant may be designated or content from multiple participants across a specified time range may be designated.

Content may therefore be designated for inclusion or exclusion on a participant basis or on a temporal basis. If a participant is designated for inclusion by an end-user, content that is associated with the unique identifier that corresponds to the designated participant is presented as part of a customized reproduction of the electronic meeting. Content that is not marked for inclusion affirmatively or by default is excluded from the customized reproduction of the electronic meeting. Hence, an electronic meeting may be reproduced that includes core original content or selected content but that excludes interrupting events or extraneous undesirable content.

In the following discussion, after some example terminology is set forth, an example environment is described that employs the techniques described herein. Example embodiment systems, details, and procedures are then described which may be performed in the example environment as well as in other environments. Consequently, performance of the example procedures is not limited to the example environment, and the example environment and systems are not limited to performance of the example procedures.

TERMINOLOGY EXAMPLES

In one or more embodiments, the term "electronic meeting," as used herein, refers to a web conference, a teleconference, a video conference, a webinar, or a combination thereof, etc. that is realized using electronic transmissions and receptions to facilitate two or more people communicating if they are not co-located within a single room.

In one or more embodiments, the term "content," as used herein, refers to slides, pointer input, screen shots or shared window views, video, audio/speech, chat/text, or a combination thereof, etc. that is presented or contributed during an electronic meeting.

In one or more embodiments, the term "participant," as used herein, refers to a person or persons who is or are taking part in an electronic meeting actively or passively. An active participant may contribute content to an electronic meeting, and a passive participant may merely be exposed to content that is presented. A host participant sponsors, controls, or provides resources for an electronic meeting. A presenting or presenter participant refers to a participant that contributes slides, screen shots, video, or a combination thereof, etc. or leads an electronic meeting. A non-presenting or non-presenter participant refers to a participant that does not lead or contribute slides, screen shots, video, or a combination thereof, etc., but a non-presenter participant may contribute content in other forms, such as chat or audio. In one instance, a host may not actively or passively participate in an electronic meeting; in another instance, a host may function as a non-presenter participant or a presenter participant. A participant may also include a participant entity that pertains to a participating site having multiple actual persons (e.g., a group of four co-workers) that are participating in an electronic meeting.

In one or more embodiments, the term "unique identifier," as used herein, refers to an identification that is unique, or not repeated or duplicated, between or among different participants of a given electronic meeting. An identification may include alphabetical or numeric characters, for example. A unique identifier may comprise, by way of example but not limitation, a name, an alias, an email address, a phone number, an individualized uniform resource identifier (URI), an individualized teleconference code, a randomly-generated string, some combination thereof, and so forth. If a participant has both an individualized URI and an individualized teleconference code, they may each represent the participant, they may be bound together to represent the participant jointly, or a different unique identifier may be assigned to the participant, which different unique identifier may or may not depend on or be derived from the individualized URI or the individualized teleconference code.

In one or more embodiments, the term "electronic meeting memorialization," as used herein, refers to a collection of content of an electronic meeting that is retained or stored in one or more files, such as at least one "JPEG" or "mp3" or "mp4" file, or in one or more organizational structures, such as at least one database. An electronic meeting memorialization may include auxiliary data, such as an ancillary image or audio file, or metadata, such as a time index or one or more unique identifiers.

In one or more embodiments, the term "content event," as used herein, refers to content that is inherently discrete, such as a slide, a chat submission, an audio exchange, a question and a corresponding answer, and so forth. Additionally or alternatively, a "content event" may refer to content that has been discretized temporally, such as by applying time slots over elapsed time to produce a content event for each time slot. A particular content event may be associated with a particular participant that contributed content of the content event.

In one or more embodiments, the term "participant channel" or "channel," as used herein, refers to a set or collection of content that is contributed by an identifiable participant, which participant may correspond to a unique identifier, during at least a portion of an electronic meeting. A participant channel may be associated with a participant that contributed content of the participant channel.

In one or more embodiments, the term "reproduction," as used herein, refers to reproducing, playing back, or creating at least a version or a facsimile of an electronic meeting that has previously been conducted. A "full reproduction," as used herein, refers to a reproduction of an electronic meeting that includes each content event contributed by every participant. A "customizable reproduction," as used herein, refers to a reproduction in which (i) one or more designated content events, which are associated with a particular time index, or (ii) one or more designated participant channels, which are associated with an identifiable participant, are explicitly included or excluded by a host participant, a presenter participant, a non-presenter participant, a person that is to observe, or a combination thereof, etc. for a reproduction that is to be presented to at least one observer.

In one or more embodiments, the term "slice," as used herein, refers to an action, process, or technique that is applied to separate, isolate, or extract certain participant channels or particular content events in or from an electronic meeting memorialization.

In one or more embodiments, the term "user interface (UI)," as used herein, refers to a mechanism or technique that enables person-machine interaction such that information is exchanged there between or such that control by one over the other is enabled. Examples of user interfaces may include, but are not limited to, visual screens, projected images, haptic feedback, sounds from a speaker, sound input to a microphone, gesture input to a camera, a touch screen, a keyboard, a mouse, motion control, or some combination thereof.

Also, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and "B").

Example Environment

FIG. 1 is an illustration of an environment 100 in an example embodiment that is operable to employ techniques described herein that relate to an electronic meeting 108. As illustrated, in addition to electronic meeting 108, example environment 100 includes at least one server device 102, one or more end-user devices 104, at least one network 106, at least one service provider 112, and one or more participants 114. More specifically, "n" end-user devices 104(1) . . . 104(n) and "n" participants 114(1) . . . 114(n) are shown, with "n" representing an integer greater than one (1). Each end-user device 104 may include at least one end-user program 116. Server device 102 may include at least one electronic meeting module 110, and electronic meeting module 110 may include at least one participant detection module 110-1.

For certain example embodiments, participants 114(1) . . . 114(n) are to participate in an electronic meeting 108 via at least one network 106 with electronic meeting module 110 to provide at least one resource to support conducting electronic meeting 108 or customizing a reproduction of electronic meeting 108. Hence, electronic meeting module 110 may at least partially implement one or more techniques or systems as described herein for customizable reproduction of electronic meetings 108. An electronic meeting 108 may, by way of example but not limitation, be offered or at least facilitated by a service provider 112 (e.g., Cisco WebEx®, GoToMeeting®, Google+ Hangouts®, Microsoft Lync®, Adobe Connect®, etc.). A service provider 112 may be associated with (e.g., own, lease, manage, etc.) server device 102 and cause to be executed electronic meeting module 110. Server device 102 may comprise, for example, a web server, a telecommunications bridge, a telecommunications switch, a voice-over-IP (VoIP) server, a server running open source software, a server of a proprietary design, a stand-alone server, a server blade, an allocated portion of a server farm, distributed server functionality, part of a data center, some combination thereof, and so forth. Although a single server device 102 is explicitly shown in FIG. 1, server device 102 may be representative of a plurality of different devices that interoperate or coordinate to perform operations "over the cloud" or "in the cloud" as is known.

Server device 102 may be configured to facilitate an electronic meeting 108, as a so-called cloud service for example, over at least one network 106. Network 106 may comprise at least a portion of one or more network types. Network types may include, but are not limited to, a public network, a private network, the internet, the web, an Ethernet, an intranet, a Wi-Fi network, a wireless network, a wired network, an LTE network, a PSTN, a cellular network, or some combination thereof. Via network 106, server device 102 may be in communication with end-user devices 104 during an electronic meeting 108.

If an example electronic meeting 108 is being conducted, a respective participant 114 of participants 114(1) . . . 114(n) may participate in electronic meeting 108 using at least one respective end-user device 104 of end-user devices 104(1) . . . 104(n). An end-user device 104 may comprise or may be configured as any suitable type of computing device. Examples of end-user devices 104 include, but are not limited to, a desktop computer, a laptop computer, a mobile device (e.g., assuming a handheld configuration such as a tablet, a mobile or cellular phone, a phablet, etc.), an entertainment appliance such as a smart television, a game console, a device configured to receive gesture input, a device configured to receive speech or video input, a device configured to provide 2D or 3D image output, a device configured to provide sound output, a wearable computing device such as a smart watch or intelligent glasses, an office phone, a cordless phone, or some combination thereof. Thus, an end-user device 104 may range from relatively high-resource devices with substantial memory and processor resources (e.g., personal computers or game consoles) to relatively low-resource devices with constrained memory or processing resources (e.g., mobile devices such as wearables). Additionally, although a single respective end-user device 104 is explicitly shown per participant 114 in FIG. 1, each participant 114 may alternatively use multiple end-user devices 104 to participate in a given electronic meeting 108 (e.g., (i) a participant may dial in with a telephonic device and log in with a web browser of a laptop device or (ii) a participant may experience presented content via a projected image from intelligent glasses and via sound emanating from an earpiece of the intelligent glasses while contributing audio or video from time to time with a smart watch).

For certain example embodiments, an end-user device 104 includes an end-user program 116. An end-user program 116 may include functionality to access web-based resources (e.g., electronic meeting services or content of an electronic meeting), to browse the Internet, to access web links embedded in an email or other electronic message, to interact with service providers, to contribute content to an electronic meeting, to dial into a teleconference bridge, to receive content for an electronic meeting, to process received content, to present processed content locally, some combination thereof, and so forth. Examples of end-user programs 116 may include, but are not limited to, a web browser, a browser plug-in, a dedicated electronic meeting application, HTML5 code, a web application, telephone code in a traditional or feature or smart phone, communication features of an operating system, or some combination thereof. Although a single end-user program 116 is explicitly shown for each end-user device 104 in FIG. 1, multiple end-user programs 116 may be working independently or in concert as part of one end-user device 104 or across multiple end-user devices 104 during an electronic meeting 108.

As noted above, for environment 100, a service provider 112 may be associated with server device 102 or with electronic meeting module 110 to provide a service for facilitating electronic meetings 108 over a network 106, such as at least the Internet. This example scenario may be considered a "cloud-based" computing environment. Generally, a service provider 112 may be configured to make various electronic meeting resources available over network 106 to participants 114, one of which hosts an electronic meeting 108. In some scenarios, an end-user that wishes to host one or more electronic meetings 108 may sign up for an account that enables access to electronic meeting resources from a service provider 112. A service provider 112 may authenticate credentials of a host (e.g., username and password of the host) before granting access to an account and associated electronic meeting resources. Non-host participants may be provided access to one or more electronic meeting resources with some level of authentication, without authentication, on a one-time-use code basis, responsive to receipt of a participant-specific or meeting-specific password, some combination thereof, and so forth. Electronic meeting resources may include, by way of example but not limitation, ability to host or join an electronic meeting, ability to send invites to an electronic meeting, ability to control an electronic meeting, ability to contribute content, ability to receive presented content, ability to store a copy of an electronic meeting, ability to retrieve or observe a stored version of an electronic meeting, ability to customize reproduction of an electronic meeting as described herein, or some combination thereof.

For certain example embodiments, an electronic meeting module 110 represents functionality to implement techniques for customizable reproduction of electronic meetings as described herein. Electronic meeting module 110 empowers a host or other user to selectively include or exclude content contributed by at least one designated participant 114 if an electronic meeting is reproduced for observation subsequent to when the electronic meeting is originally conducted. An electronic meeting module 110 may be implemented as a software package, a hardware device, or using a combination of software, hardware, firmware, fixed logic circuitry, etc. An electronic meeting module 110 may be implemented as a standalone component of a server device 102 as illustrated in FIG. 1. Additionally or alternatively, an electronic meeting module 110 may be configured as a component of another application, as a component of an operating system of a device on which it is executing (e.g., a server device 102 or an end-user device 104 in a peer-to-peer sceneario), as a plug-in module, as a standalone service or as a service integrated with other services, as another device application or functionality, as a library available to another program, as an application programming interface (API) available to another program, or a combination thereof, and so forth. Furthermore, although an electronic meeting module 110 is shown located at a server device 102 in FIG. 1 and described herein as a service that is primarily cloud-based, at least a portion up to an entirety of an electronic meeting module 110 may instead be situated at one or more end-user devices 104 with electronic meeting functionality likewise at least concentrated at or emanating from at least one end-user device 104. In such embodiments, electronic meeting reproduction customization or electronic meeting hosting may be implemented at least partially by or at an end-user device 104.

An electronic meeting module 110 may include a participant detection module 110-1. For certain example embodiments, participant detection module 110-1 detects if a participant 114 registers to participate in an electronic meeting 108 using at least one end-user device 104. A participant 114 may attempt to register attendance at an electronic meeting 108 by "entering" a virtual meeting room of a host; by logging into a site of an electronic meeting service provider with a username or a password; by clicking or pointing a browser toward a shared or individualized URI (e.g., which may be received in an email or other electronic message); by dialing a teleconference number and then (i) entering a host-related identification number, (ii) entering a shared meeting-related identification number, or (iii) entering a shared or individualized participant-related passcode; by selecting a displayed meeting invite from among a list of invites on a web page; by activating a meeting invite that is currently made available by an application that is at least partially dedicated to providing electronic meetings; by some combination thereof; and so forth. A participant detection module 110-1 may detect registration by a participant 114 to thereby entitle an associated end-user device 104 to receive content that is presented as part of an electronic meeting 108 or to contribute content that may be presented as part of an electronic meeting 108. A participant detection module 110-1 may also determine (e.g., receive, assign, generate, retrieve, or calculate) a unique identifier that is to correspond to a participant 114 with respect to a given electronic meeting 108.

Having considered an example environment, consider now a discussion of some example details of the techniques for customizable reproduction of electronic meetings in accordance with one or more embodiments.

Customizable Reproduction of Electronic Meetings

Figure 2:
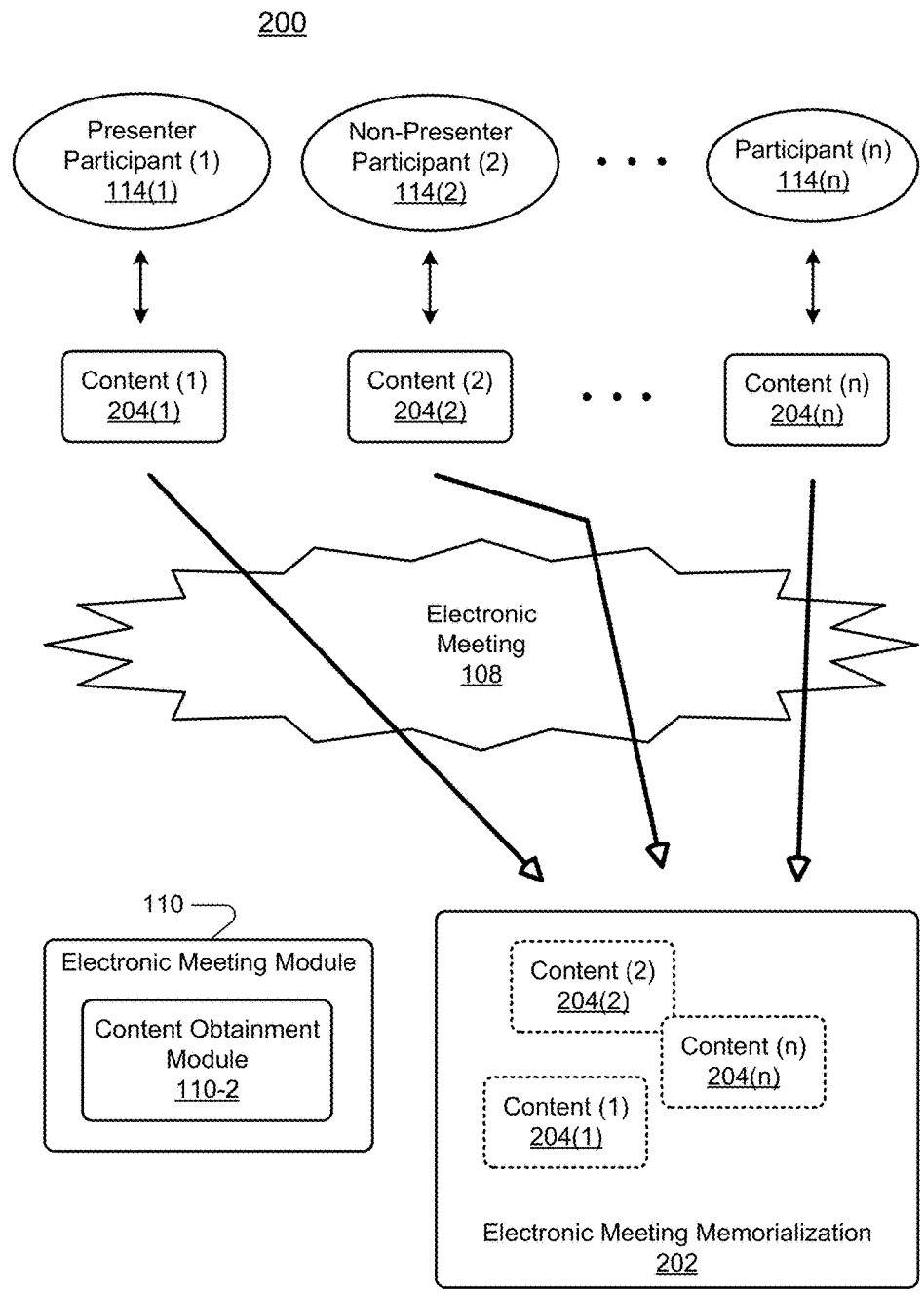
FIG. 2 illustrates portions of the environment from FIG. 1 with regard to obtaining content of an electronic meeting in accordance with one or more example embodiments.

This section describes some example systems or details of customizable reproduction of electronic meetings in accordance with one or more embodiments. FIG. 2 depicts generally at 200 some portions of the environment 100 of FIG. 1, but with regard to an example of obtaining content of an electronic meeting. In particular, acquisition and initial management of content that forms a part of, or is at least associated with, an electronic meeting 108 is described. As illustrated, example environmental portion 200 includes multiple participants 114, multiple instances of content 204, an electronic meeting 108, an electronic meeting module 110, and an electronic meeting memorialization 202. More specifically, "n" participants 114(1) . . . 114(n) and "n" items of content 204(1) . . . 204(n) are shown, with "n" representing an integer greater than one (1). Electronic meeting module 110 may include at least one content obtainment module 110-2. For the sake of visual clarity, devices (e.g., end-user devices 104, a server device 102, network 106— which implicitly includes network devices such as base stations or routers, etc.) are omitted from FIGS. 2-8.

For certain example embodiments, content obtainment module 110-2 obtains content 204 from participants 114 during or as part of electronic meeting 108. Respective content 204 is obtained from respective participants 114. In other words, content 204(1) is obtained from participant 114(1), content 204(2) is obtained from participant 114(2), and so forth up to content 204(n) being obtained from participant 114(n). Content obtainment module 110-2 may collect (e.g., accumulate, aggregate, save, store, retain, or combination thereof) content 204 as part of electronic meeting memorialization 202. As shown, electronic meeting memorialization 202 includes content 204(1), content 204(2), and so forth up to content 204(n). Obtained content 204 may initially be collected in any manner and then organized. Alternatively, content 204 may be organized as part of a collection process or contemporaneously with collection. Example channel-based organizational techniques are discussed herein below with particular reference to FIG. 3.

As shown in FIG. 2, but by way of example only, participant 114(1) represents a presenter participant, and participant 114(2) represents a non-presenter participant. As such, for at least part of an electronic meeting 108, presenter participant 114(1) contributes content 204(1), which content may include slides, audio, video, screen sharing, chat— including but not limited to chat responses, some combination thereof, and so forth. From time to time during electronic meeting 108, non-presenter participant 114(2) may contribute content 204(2), which content typically includes audio or chat submissions, but may instead or also include content such as temporarily sharing their own screen or controlling user interface input of an end-user device 104(1) (e.g., of FIG. 1) of presenter participant 114(1). Generally, content 204(1), content 204(2) . . . content 204(n) that is obtained by content obtainment module 110-2 is collected as part of electronic meeting memorialization 202.

Figure 3:
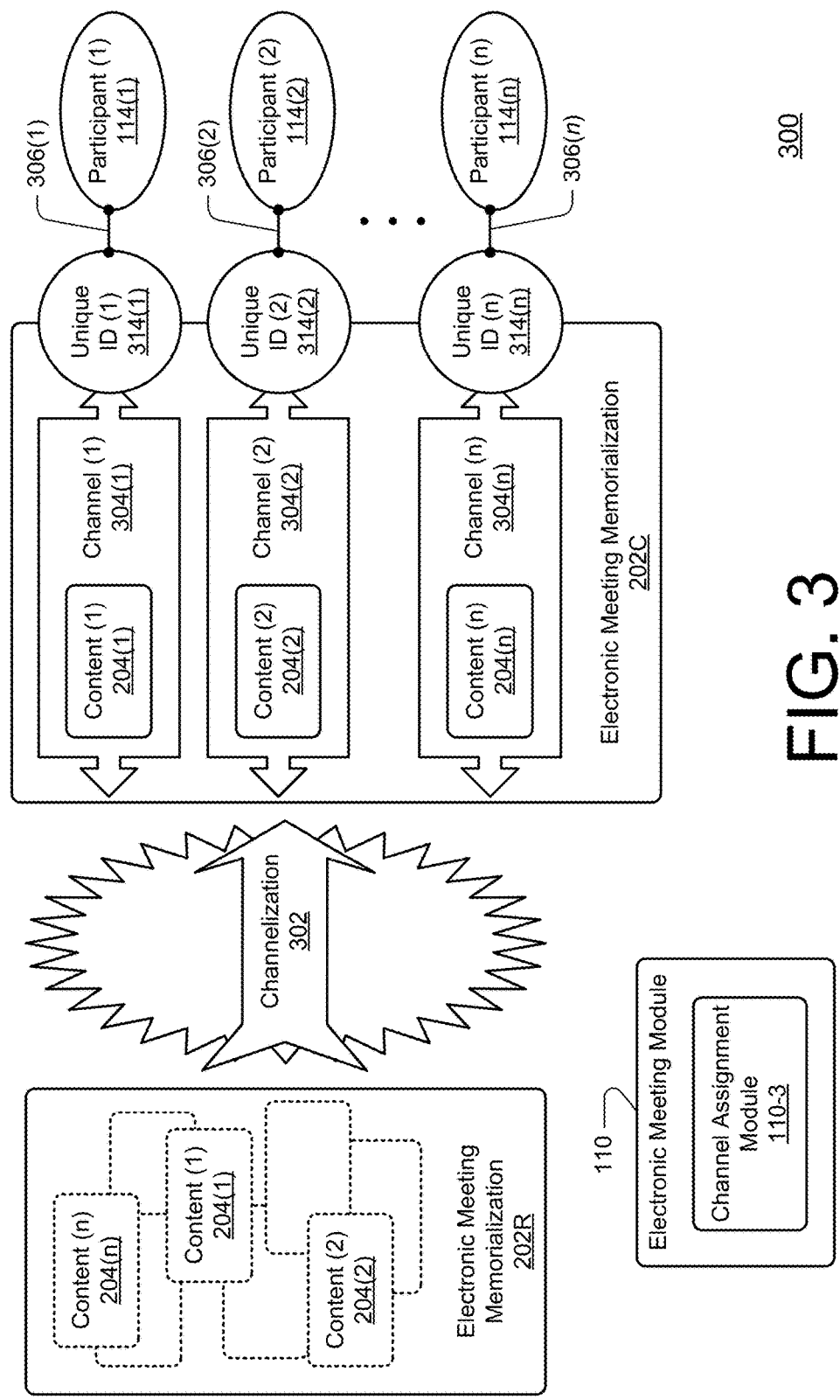
FIG. 3 shows channel assignment for participants of an electronic meeting in accordance with one or more example embodiments.

FIG. 3 shows at 300 generally channel assignment for participants 114 of an electronic meeting in accordance with one or more example embodiments. Illustrated in FIG. 3 are, from left to right, a first block representative of an electronic meeting memorialization 202R—with received content, a first set of multiple instances of content 204 that are depicted with dashed lines, a channelization 302, a second block representative of an electronic meeting memorialization 202C—with channelized content, multiple channels 304, a second set of multiple instances of content 204 that are depicted with solid lines, multiple unique identifiers (IDs) 314, multiple correspondences 306, multiple participants 114, and an electronic meeting module 110. More specifically, "n" items of content 204(1) . . . 204(n), "n" channels 304(1) . . . 304(n), "n" unique identifiers 314(1) . . . 314(n), "n" correspondences 306(1) . . . 306(n), and "n" participants 114(1) . . . 114(n) are shown. Electronic meeting module 110 may include at least one channel assignment module 110-3.

As discussed above, content 204 from multiple different participants 114 may be collected as a single inseparable monolithic entity. Additionally or alternatively, content 204 may be held in a buffer to facilitate content processing for presentation or organization. A block representative of electronic meeting memorialization 202R for received content that is depicted to the left of the arrow indicative of channelization 302 may represent any one or more of these conditions for received content 204, or the block may merely represent a conceptual state for disorganized or monolithic content 204 that can be avoided in accordance with one or more example implementations of channelization 302.

For certain example embodiments, channel assignment module 110-3 assigns a channel 304 to a participant 114. More specifically, channelization 302 includes assigning a respective channel 304 of channels 304(1) . . . 304(n) to a respective participant 114 of participants 114(1) . . . 114(n). A channel 304 may be associated with a unique identifier 314 or with a participant 114, which participant 114 may correspond 306 to a unique identifier 314. In operation, content 204 that is contributed by a participant 114 may be funneled or applied to a channel 304 that is associated with the contributing participant to create electronic meeting memorialization 202C for channelized content. For example, content 204(2) that is contributed by participant 114(2) is applied to channel 304(2) that is associated with participant 114(2), and the participant 114(2) corresponds 306(2) to unique identifier 314(2). Examples of processing content from multiple respective participants at least partially based on multiple respective channels to enable customizable reproduction of an electronic meeting is described below with particular reference to at least FIG. 4.

Figure 4:
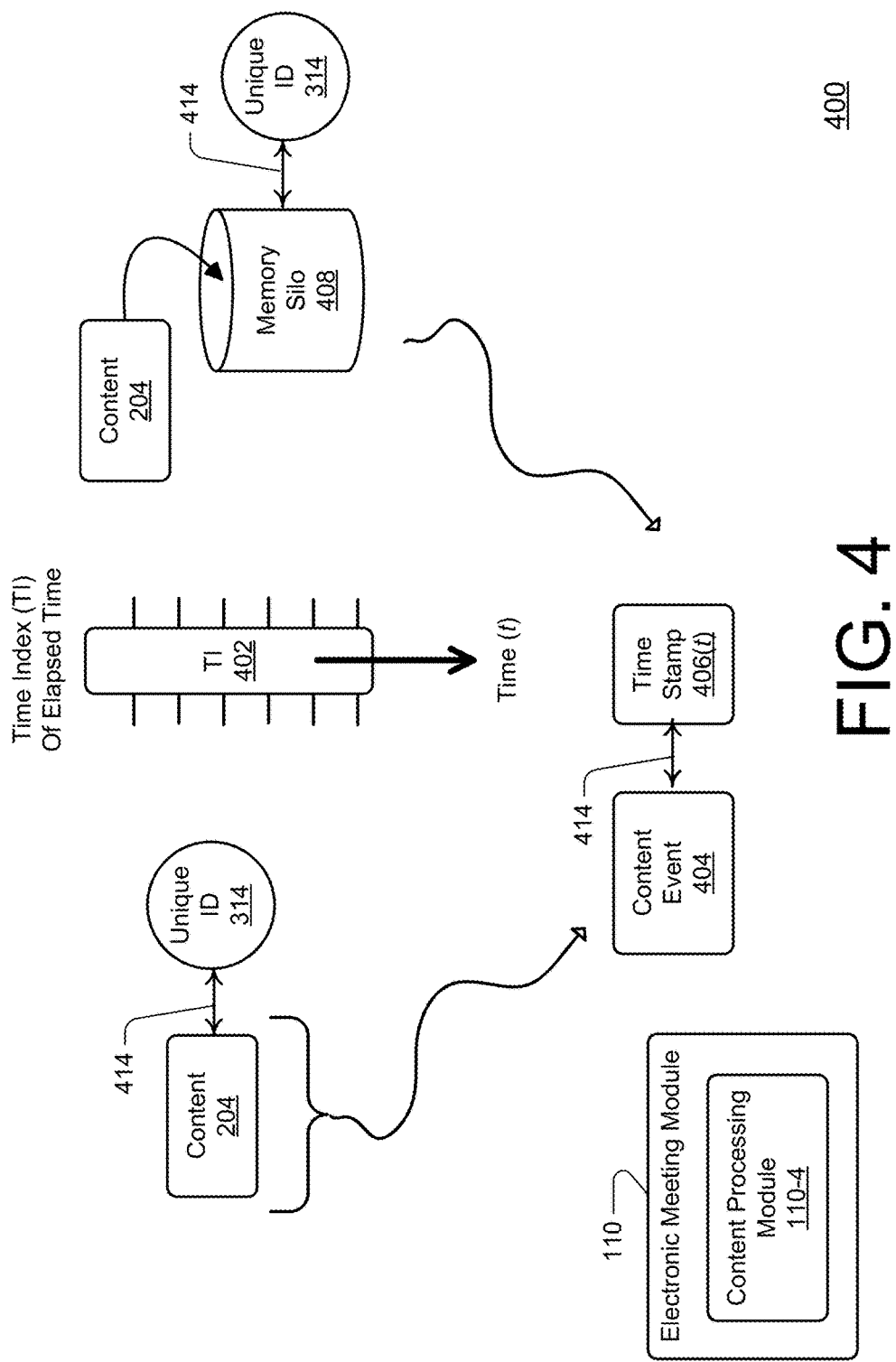
FIG. 4 shows content processing in accordance with one or more example embodiments.

FIG. 4 shows generally at 400 content processing in accordance with one or more example embodiments. Illustrated in FIG. 4 are content 204, an association 414, a unique identifier 314, a time index (TI) 402, a content event 404, a time stamp 406(t), a memory silo 408, and an electronic meeting module 110. Electronic meeting module 110 may include at least one content processing module 110-4.

As an electronic meeting unfolds, time elapses. Elapsed time of an electronic meeting may be tracked using a time index (TI) 402 for the elapsed time. Time index 402 may track time in terms of seconds, frames, groups of pictures, minutes and seconds, an arbitrary unit of time, a combination thereof, and so forth. Content that is being contributed, received, presented, etc. with regard to an electronic meeting may be mappable to a time index of the electronic meeting.

For certain example embodiments, content processing module 110-4 stores content 204 in association 414 with a respective unique identifier 314 of multiple unique identifiers (e.g., as shown in FIG. 3). As shown to the left of the rectangular indicator of time index 402, a unique identifier 314 may be stored in association 414 with content 204 that was obtained from a participant 114 (e.g., at least of FIG. 3) that corresponds to unique identifier 314. Additionally or alternatively, as shown to the right of the rectangular indicator of time index 402, content 204 may be stored in a memory silo 408 that is associated 414 with a unique identifier 314 with content 204 having been obtained from a participant 114 (e.g., at least of FIG. 3) that corresponds to unique identifier 314. A memory silo 408 may include, by way of example but not limitation, a memory buffer, an assigned set of addresses, a contiguous address range, a container, a linked list, a portion of a data base, a data structure, a file, or some combination thereof.

Content may also be stored in association with a version of time index 402. In an example embodiment, a content event 404 may be associated 414 with a time stamp 406(t). A content event 404 may comprise a discrete snippet of content 204 that occurs on or around, starts at, or completes at time stamp 406(t) as derived from time index 402. A time stamp 406(t) may correlate to a block of time or a range of time indexes 402 that includes an associated content event 404. Hence, by way of example only, a time stamp 406(t) may comprise (i) two time indexes 402 to establish an initial time and a final time of a time block or (ii) one time index 402 and a duration to set two edges of a time block. Additionally or alternatively, a time stamp 406(t) may correspond to a time at which an associated content event 404 was contributed or is to be presented as part of a reproduction. Hence, by way of example only, a time stamp 406(t) may comprise a time index 402 when content from an associated participant should be included for a presentation stream of a reproduction of an electronic meeting if the associated participant is designated for inclusion in the reproduction. Time stamps 406(t) may be derived from a time index 402 in a different manner or may correlate to content events in other manners.

FIG. 5 depicts electronic meeting content that has been processed in accordance with one or more example embodiments. For example, electronic meeting content that has been processed by channelizing content on a per-participant basis for an electronic meeting memorialization 202C is shown from a logical or memory organizational perspective. In FIG. 5, by way of example only, nine participants #1-#9 are shown in nine rows. Participant #1 is indicated to comprise a presenter participant. A bottom row indicates a time index that spans from zero to 75 time units with the illustrated numerals spanning three to 75 in an increment of "3". However, a different increment may alternatively be used. The letters "P," "A," and "C," represent "presenter," "audio," and "chat," respectively. Although not shown in FIG. 5, an electronic meeting memorialization 202 may reflect additional or alternative types of content.

For certain example embodiments, each row may represent a channel that is associated with the indicated participant. Each row represents a potential stream of content that is segmented into multiple blocks by time, which may be referred to as a time slot. Each block may therefore represent multiple content events, one content event, a portion of a content event, a combination thereof, and so forth. As such, each block or content event may correspond to at least one unit of time, or time slot, along a time index. As shown, each block or content event corresponds to three time units, with the illustrated number indicative of a last time unit of a time index (e.g., a "9" in the third column indicates that the third column corresponds to time units 7-9).

For participant #1, who is a presenter of an electronic meeting, there is a presenter indication at each content block from 3 to 75. For participant #2, there is an audio indication at content block 3. For participant #3, there are audio indications at content blocks 3, 24, 27, 45, 48, and 75, and there are chat indications at content blocks 30, 57, and 60. Other ones of participants #4-#9 have content indications at particular content blocks as shown in FIG. 5. In operation, one or more participants, or content therefrom, may be explicitly designated for inclusion (or exclusion) in a customized reproduction of an electronic meeting. Accordingly, content from a channel, as represented by a row in FIG. 5, that is associated with each designated participant may be included in an electronic meeting reproduction. During reproduction or as part of processing prior to reproduction, at each time index column or time slot, a block with a content indicator that is part of a channel/row that is associated with a designated participant may be incorporated into a presentation of an electronic meeting reproduction. To facilitate a customized reproduction of an electronic meeting, content of an electronic meeting memorialization 202C may be sliced by channel on a per-participant basis. An example of channel slicing is described below with particular reference to FIG. 6.

FIG. 6 depicts generally at 600 electronic meeting content that has been processed in accordance with one or more example embodiments. More specifically, but by way of example only, electronic meeting content has been processed by slicing content that has been channelized on a per-participant basis for an electronic meeting memorialization. Respective content that is associated with respective ones of multiple participants #1-#9 may be sliced to enable respective content to be isolated or to be separately or selectively retrieved or presented as part of a customized electronic meeting reproduction. In FIG. 6, by way of example only, four participants #1, #2, #3, and #7 are shown as having been designated for inclusion in an electronic meeting reproduction.

Figure 7:
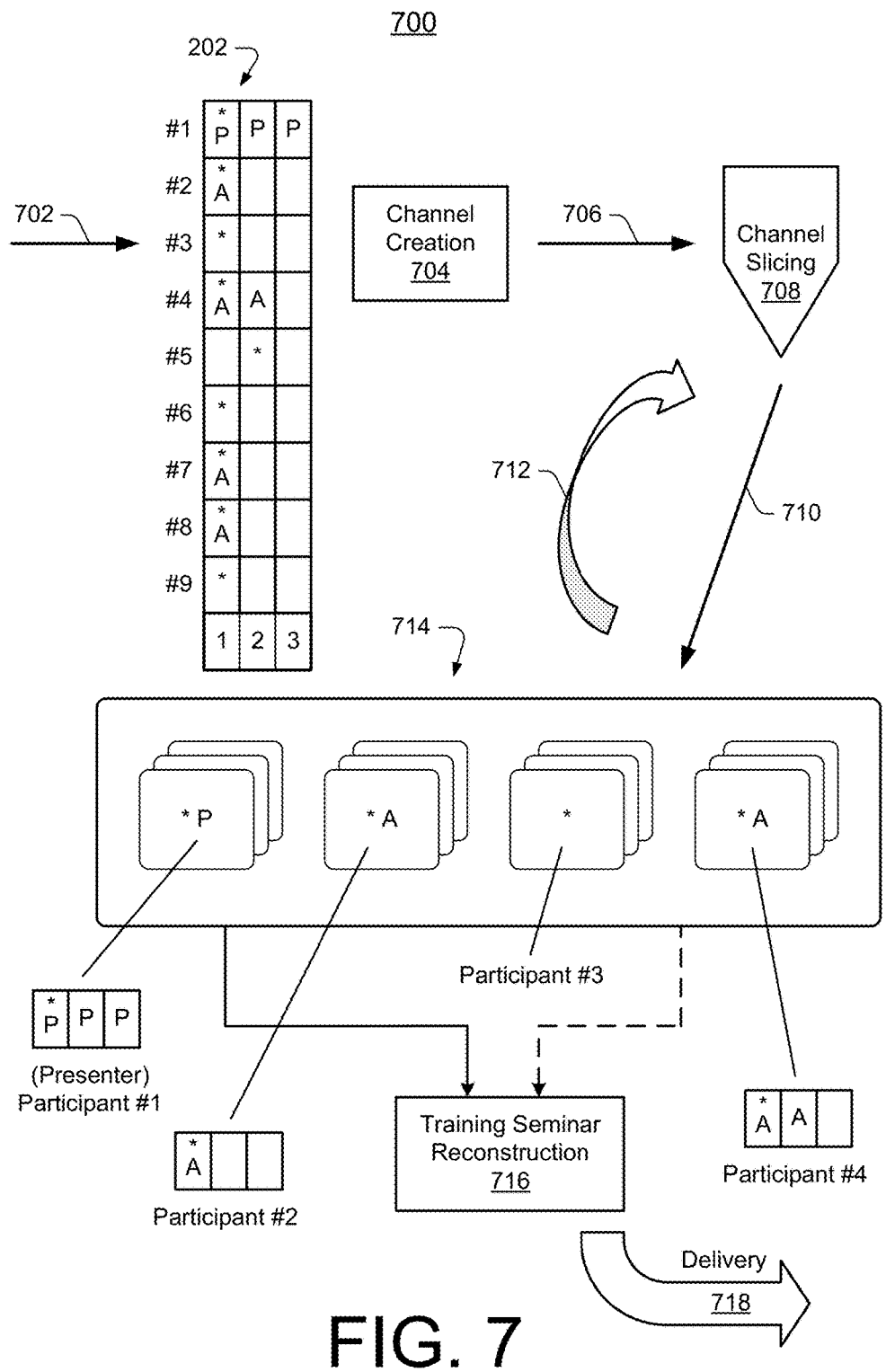
FIG. 7 illustrates a technique for manipulating content that is part of a training seminar in accordance with one or more example embodiments.

With reference below to FIG. 7, various principles or aspects of certain example embodiments are discussed in a context of a specific training session or seminar hypothetical that is conducted via a webinar. For this example, each event that is related to webinar participation or interaction may be categorized into one of two categories: (1) 'Structured Integrated' events or (2) 'Unstructured External' events. Each event may be associated with a unique identifier corresponding to a user participant who triggers the event. Each unique identifier may be assigned or mapped to a communication channel, and associated events (with regard to a respective unique identifier) may be mapped to the communication channel.

An event, from the perspective of an electronic meeting module 110 (not shown in FIG. 7), may refer to an occurrence or a reason that prompted or caused an end-user program 116 (not shown in FIG. 7) to send data encapsulating the occurrence or reflecting the reason to electronic meeting module 110. An event may also relate to internal processing of electronic meeting module 110. The term "Structured Integrated events," as used herein, refers to events or status changes that are inbuilt into a webinar process or technology or that are directly originating from a webinar-related application (e.g., an incident of webinar application processing—such as connection established, a meeting recording activation, a user login act, or a polling series or instance—such as a general indication of presence or a specific response to a question, which may be multiple choice). The term "Unstructured External events," as used herein, refers to events or actions that originate external to a webinar-related application or that are external inputs or actions (e.g., a participant asking a question, a participant initiating a communication over chat, or a participant talking to other participant attendees). A "Structured Integrated event" may be considered behind-the-scenes communication or processing carried out by a webinar-related application to make a webinar happen or to enable particular webinar functionality. An "Unstructured external event," on the other hand, may be considered upfront interactions with the webinar-related application that results in content being submitted, whether the content is (i) intended or beneficial content or (ii) inadvertent, noisy, or unhelpful content. For simplification purposes, "Structured Integrated events" may be shortened to "structured," and "Unstructured External events" may be shortened to "unstructured" herein below.

To begin a training seminar, a webinar host may start an electronic meeting, with the meeting being recorded. A 'start' meeting event is triggered and is categorized as a 'Structured Integrated' event in a database. A meeting record event is triggered and is added to the database. A 'record' event is categorized as a 'Structured Integrated' event. Meeting attendee participants may join the meeting through a prescribed login screen, through phone line attendance, a combination thereof, and so forth. Each participant uses a respective unique identifier to register attendance at (e.g., to log onto) the meeting. Each individual user with a corresponding user identifier that successfully performs a login is considered a 'Structured Integrated' event. Each participant is represented with a unique identifier and assigned a unique channel for communication, which communication may include text, audio, video, combinations thereof, and so forth. Communications originating from a specific user with an associated unique identifier are mapped to a channel associated with the specific user.

Typically, at least some participants register before a meeting is started (e.g., before a host enables cross communication), and some participants join after the meeting is started. After a virtual meeting room is opened or cross-communication is enabled, a meeting may progress. For example, participants may start talking, make comments, greet each other, or otherwise say different things to each other while they are waiting for a presenter to start speaking.

For example operations during a meeting, a 'speaking' event may be triggered if a participant speaks. Each speaking event may be associated with a unique identifier of a participant who is speaking, and an individual channel may be associated with a unique identifier of a participant who is speaking at a given moment. A speaking event is marked as an 'Unstructured External' event. A time stamp indicative of a moment and a duration at which a participant spoke may also be associated with the speaking event. For a chat session that is started by a participant, the chat session is categorized as an 'Unstructured External' event, and a unique identifier corresponding to the participant may be associated with the chat session. A time stamp may further be associated with the 'Unstructured External' event categorization that is applied to an entry in the database corresponding to the chat session. The chat session communication may also be mapped to the communication channel that is created for the user participant who made the chat submission.

Eventually, a presenter participant arrives and attempts to lead the meeting. Other participants usually stop talking to each other, and ambient meeting noise as well as extraneous murmuring decreases so that the presenter may start the meeting in a formal manner. Meeting contributions from the presenter (e.g., speaking, greeting audience members, slide sharing, etc.) are also captured as 'Unstructured External' events and are associated with a unique channel that is assigned to the presenter and corresponds to a unique identifier of the presenter for the webinar training session.

As the webinar progresses, non-presenter participants may ask questions or interrupt the speaker at different times throughout the session. Logic captures each moment that an event or action originates from a meeting participant while the webinar training session is being conducted. After the training session is completed, a list of channels that were activated is created. Each respective channel is associated with a respective participant that contributed content for the respective channel. Actions taken by a participant during the meeting session are listed as being associated with a unique identifier of the participant's channel. Each channel may therefore list 'Unstructured External' events or 'Structured Integrated' events that occurred during the meeting session.

After a webinar training session concludes, at least the host of the webinar may be empowered to access the list of participant channels that were activated during the webinar. The webinar host or automatic logic may separate events into structured and unstructured events. If not already so marked by a default mechanism, the webinar host may mark the presenter participant's channel as a core or original channel. If an entire presenter or other participant's channel is designated for inclusion, but a webinar host wishes to omit a portion thereof (e.g., initial noise or small talk), temporal portions or noisy content thereof may be designated for omission by de-selecting them from inclusion or by designating them for exclusion. The webinar host may also be empowered to customize selection of individual channels that are to be superimposed on the presenter's core channel. Using a list of identified structured and unstructured events, the webinar host identifies content that came from the presenter participant (e.g., using the presenter's associated core channel) and unstructured event content that was added to a webinar training session from the audience generally as background sounds, from individual participants that generated specific events, or other interruptions that occurred during the meeting.

In addition or in alternative to enabling a host or presenter to designate channels for customized reproduction of the meeting, other participants or non-participants may be permitted to select whichever channels they wish to include with (e.g. to have superimposed on) a core presenter's channel if they are having the webinar training session be reproduced (e.g., if they are having the recording played back by a webinar service). Responsive to selection of one or more channels made by a requesting observer, a presenter's core content plus superimposed content from at least one selected channel is reproduced for the requesting observer while excluding unselected channels.

FIG. 7 illustrates at 700 generally a technique for manipulating events that are part of a webinar training session example of an electronic meeting in accordance with one or more example embodiments. As indicated at arrow 702, indications of events that occur at different time slots are shown as electronic meeting memorialization 202. A "Structured Integrated event" may be represented as at least one character, such as an asterisk "*" (as shown), a numeral, a code—which may include alphanumeric or other ASCII characters, and so forth. An "Unstructured External event" may be represented by a letter, such as "A" or "P," as also shown in FIGS. 5 and 6. In this example training seminar, the asterisk "*" indicates that a participant has logged into the training seminar. Participants #1-#4 and #6-#9 logged in during a first time unit "1." Participant #5 joined late, however, and logged in during a second time unit "2."

As indicated at block 704, events (e.g., collected content or noted application actions) are sliced with respect to participant to create participant channels. As discussed above for this training session webinar example, each webinar meeting participant is assigned a channel that is associated with a unique identifier corresponding to the assigned webinar meeting participant. Each participant's channel includes (i) content that is associated with (e.g., performed by, contributed by, or provided by) the participant or (ii) actions that are associated with (e.g., taken by, implemented for, or instigated by) the participant.

As indicated at arrow 706, each participant channel is fed to a channel-level slicer. As indicated by block 708 and arrow 710, each participant channel is sliced to segregate the events into structured events versus unstructured events, as per actions performed by an associated participant versus content that is contributed by the associated participant during the webinar session. As indicated by arrow 712, the channel-level slicing of block 708 may be repeated until the events of each participant channel are sliced.

Thus, meeting events may be processed by slicing events of an electronic meeting memorialization 202 into participant channels and by slicing events on a channel level into structured events and unstructured events. After processing, as indicated by reference arrow 714, each participant's Unstructured External events or content may be individually available as a channel associated with the participant and at least logically isolated or differentiated from content of other participants' channels as shown by representations of content, such as "A" or "P". Additionally or alternatively, each participant's Structured Integrated events or actions, or at least indications thereof, may be individually available as shown by representations of application processing or status, such as an asterisk "*" that indicates participant log-in or log-out of the training seminar. As indicated by block 716, a training seminar may be reconstructed by including a presenter participant's core original content but excluding content from channels of other participants. Additionally or alternatively, relevant or desired content from non-presenter participants may also be included in a training seminar reproduction if such content is deemed likely to enhance the core original content for future observers. As indicated by large arrow 718, a customized electronic meeting reproduction (e.g., a reconstruction of a webinar's original content, a video conference with presenter and designated non-presenter input included, a teleconference with a screen sharing component in which selected participant's chats are excluded, or some combination thereof) may be streamed to an observer, may be transmitted as a file to an observer, may have screen shots transmitted as a file and audio streamed to an observer, a combination thereof, and so forth.

Figure 8:
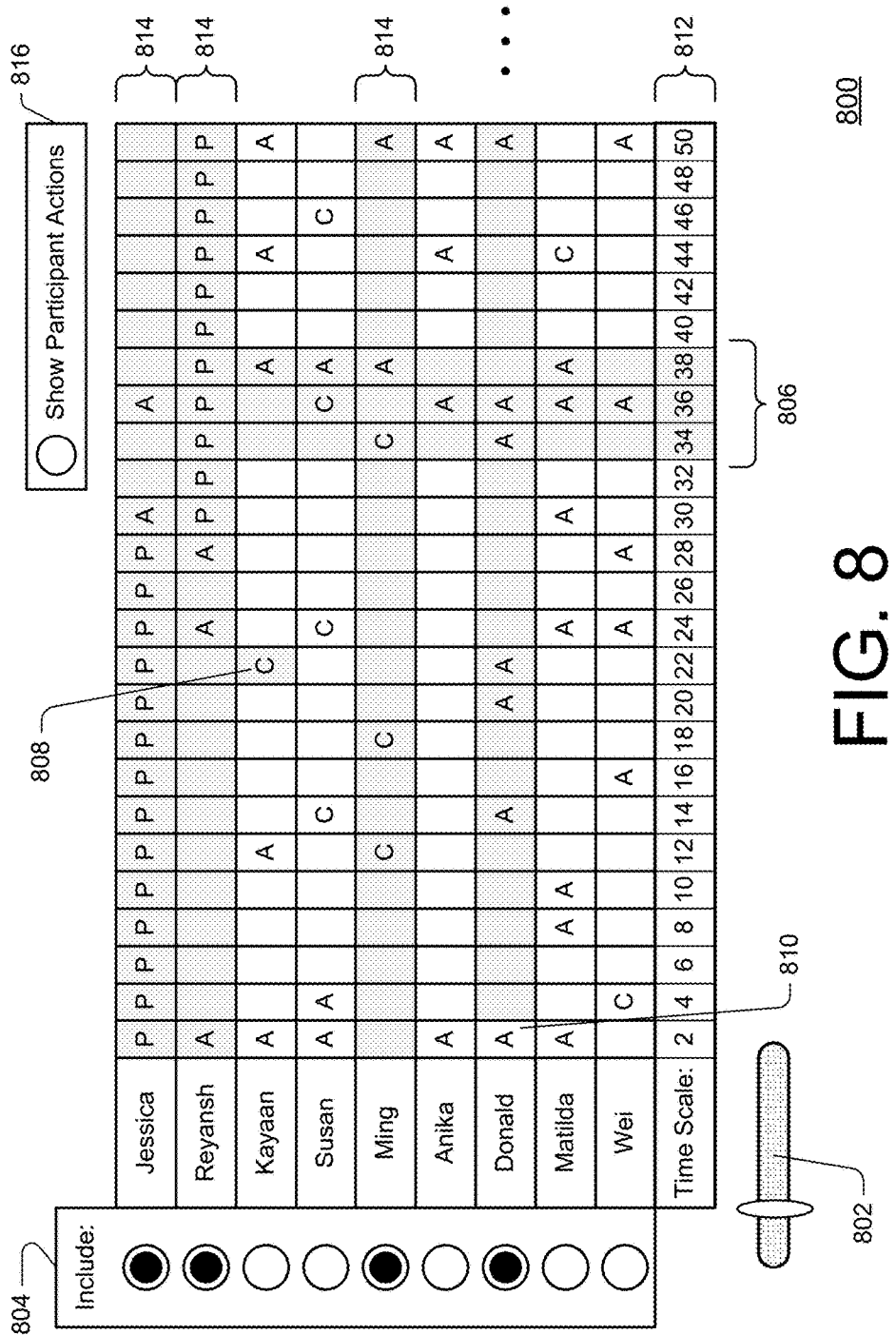
FIG. 8 depicts an example user interface for creating a customized reproduction of an electronic meeting in accordance with one or more example embodiments.

FIG. 8 depicts an example user interface 800 for creating a customized reproduction of an electronic meeting in accordance with one or more example embodiments. As illustrated, user interface 800 includes nine rows representing nine event channels for nine participants. Names of the nine participants are Jessica, Reyansh, Kayaan, Susan, Ming, Anika, Donald, Matilda, and Wei. User interface 800 may be displayed by an end-user device 104 (e.g., at least of FIG. 1) within a window of an operating system, as part of a page of a browser, as part of an image of an application, a combination thereof, and so forth. Instructions for presenting user interface 800 may be executed or generated, or may otherwise originate remotely, at a server device 102 (e.g., at least of FIG. 1). A host, a presenter participant, a non-presenter participant, a non-participant, an observer, a combination thereof, and so forth may be given permission to interact with a user interface 800 to customize an electronic meeting reproduction.

For certain example embodiments, user interface 800 images or displays or otherwise includes: a slider 802, an include or exclude column 804, multiple participant rows 814 for channels associated with participants, a time scale row 812, time slot columns 806, individual time slot blocks 808 and 810, or a show participant actions toggle feature 816. Show participants actions feature 816, if present, enables an end-user to toggle on and off indications of participant actions or internal application processing events.

For example, if show participants actions feature 816 were activated, at least indications of participant's actions may be represented in user interface 800. Examples of indicators may include an asterisk "*," a code such as one or more characters, an abbreviation (e.g., "LI" for logged in, "LO" for logged out, or "PR" for polling response), a color or pattern change or highlighting of text or background of a block, inclusion of a subscript or superscript, a display of an actual polling response (e.g., option "A," option "completely satisfied," option "more than 75% of the time," option "3," or options "was" or "was not"), or a combination thereof. Electronic meeting memorialization 202 (of FIG. 7) illustrates an example approach for an asterisk "*" implementation that may be displayed as part of a user interface 800. An end-user may wish to know when all participants were logged in, if a participant logged out early, and so forth. Also, an end-user may wish to know if a participant responded to each polling question, what specific response was given by each participant to polling questions, and so forth. A menu option may enable an end-user to select which participant actions or internal application processing events are to be indicated or currently displayed. Additionally or alternatively, an end-user may be empowered via a user interface feature to select that Structured Integrated events are shown in user interface 800 along with Unstructured External events, are shown in user interface 800 instead of Unstructured External events (e.g., to better focus on polling responses), and so forth.

Time scale row 812 may correspond to a time index (e.g., of FIG. 5) that tracks elapsed time of an electronic meeting. A user may adjust a time scale row 812 by moving slider 802 to increase or decrease a granularity of each time slot. As shown, each time slot corresponds to two time units (e.g., two minutes) over 50 time units. If slider 802 is moved leftward, each time slot may correspond to less time, such as one time unit. Thus, user interface 800 may be updated to display 50 time slot columns with each time slot representative of e.g. one minute. If slider 802 is moved rightward, on the other hand, each time slot may correspond to more time, such as five time units. Thus, user interface 800 may be updated to display 10 time slot columns with each time slot representative of e.g. five minutes. If there is contributed content during a given five minute time slot, then an appropriate content indicator may be displayed, even if the contributed content was present for only a small portion— such as 10 seconds—of the five minutes. By way of example only, time slots may be scaled to as small as 1-5 seconds up to as long as an entire electronic meeting. As the time slots become smaller in duration and consequently more numerous for a given electronic meeting, user interface 800 may be adjusted to enable horizontal scrolling along the time slots.

Alternatively, time scaling may be performed in a more automatic fashion. As one example, a time slot duration may be determined such that a presentation length of contributed content occupies no less than a certain portion—such as half—of the determined time slot duration. As another example, a time scale may be adjusted, and content indicators may be displayed, based at least partially on anchor points for contributed content. An anchor point may comprise a time instant at which a participant's channel has a content change—such as a start or an end to a content contribution. Temporal locations or durations of individual time slots may be determined based on such anchor points. Blocks defined by time slots may reflect the temporal locations of anchor points. For instance, a new time slot column, and blocks that form the new time slot column, (i) may be created at or for each anchor point, (ii) may be created if a threshold number of channels have or would have an anchor point during the new time slot column, a combination thereof, and so forth. As a specific example: If no content is contributed by non-presenter participants for the first 15 minutes of an electronic meeting, then a corresponding time slot column may have a duration or width of 15 minutes, or some configurable minimum duration such as 5 minutes. If new content is contributed every 15-30 seconds for the next 10 minutes of an electronic meeting, then there may be 20 time slot columns having a duration or width of 30 seconds each over that next 10 minutes. Accordingly, a time scale for time scale row 812 may be non-uniform.

Include or exclude column 804 may have a number of selectable user interface items, such as a circular button as illustrated. User interface items of include/exclude column 804 may reflect that selected rows are to be incorporated into an electronic meeting reproduction or are not to be so incorporated. In other words, an activated (e.g., checked, "X'd", or filled in circle) user interface item may reflect that a row is to be excluded or that a row is to be included because the corresponding participant is being designated for exclusion or inclusion. Default selections may be established such that certain rows are included or excluded by default. For example, all rows may be included by default such that a user de-selects any rows that are not desired. Alternatively, presenter participant rows may be selected for inclusion by default with non-presenter participant rows not being selected or otherwise set for exclusion by default such that an end-user is to affirmatively select those non-presenter participants having content that should be included in an electronic meeting reproduction.

For certain example embodiments, each participant row 814 may have multiple blocks representing time slots. Each block may have an indication that content was contributed by an associated participant during a given time slot. For instance, block 808 has a "C" indication, and block 810 has an "A" indication. The "A" indication of block 810 may represent that participant "Donald" contributed audio content of some length during at least part of time units 1-2, such as for an entirety of time units 1-2 or for half of time unit 2. Although presenter ("P"), audio ("A"), and chat ("C") indicators that represent content contributions are shown, other indicators may additionally or alternatively be displayed as part of user interface 800. By way of example only, blocks with content that have been selected for inclusion are shown as being highlighted (e.g., darkened as shown, but they may instead have a different color, have bolded text or thickened lines, etc.). Hence, rows of designated participants (e.g., Jessica, Reyansh, Ming, and Donald) are highlighted in the illustrated example.

Additionally or alternatively, content may be selected for inclusion or exclusion in other groups. For example, entire time slot columns (or time scale columns) 806 may be selected (e.g., by clicking on a number along time scale row 812, such as "34," "36,", or "38"). For instance, if Ming initiates an interesting, pertinent discussion with a chat submission "C" at time slot column "34," a presenter may wish to include content that pertains to that discussion across multiple participants, until any relevant issues are fully addressed. As an example for selecting content of a specific block for inclusion, block 808 may be selected so that Kayaan's chat submission "C" at time slot column "22" is included because the chat submission precipitated presenter participant Reyansh to contribute audio content "A" at time slot column "24," which is prior to Reyansh's "official" presentation beginning around time slot columns "28" or "30." As an example for selecting content of a specific block for exclusion, if a host wishes to exclude initial conversation that is from non-presenter participants as an electronic meeting is initiated, any such content at time slot column "2" for a designated participant may be de-selected, as is shown at block 810 for Donald. Although not explicitly shown, a specific time slot block in a designated time slot column (e.g., a column of time scale "34," "36," or "38" as shown) may likewise be de-selected. As yet another example, an observer may elect to follow or locate content provided by a specific participant as a customized reproduction of an electronic meeting. For instance, if other participants (including but not limited to co-presenter participants Jessica and Reyansh) are de-selected for inclusion (or selected for exclusion) and Matilda is selected for inclusion (or de-selected for exclusion) because Matilda is a user's boss, then the user may relatively quickly observe a reproduction of an electronic meeting that focuses on audio and chat contributions of Matilda.

Having discussed example systems and details of techniques for customizable reproduction of electronic meetings, consider now some example procedures to illustrate additional aspects of the techniques.

Example Procedures

This section describes example procedures for customizable reproduction of electronic meetings in one or more embodiments. Aspects of the procedures may be implemented in hardware, firmware, or software, or a combination thereof. The procedures are shown as a set of blocks that specify operations that may be performed by one or more devices and are not necessarily limited to the orders shown for performing the operations by the respective blocks, for the operations may be performed in other orders or in fully or partially overlapping manners. In at least some embodiments, the procedures may be performed by a suitably configured device, such as the example server device 102 of FIG. 1 that makes use of an electronic meeting module 110.

Figure 9:
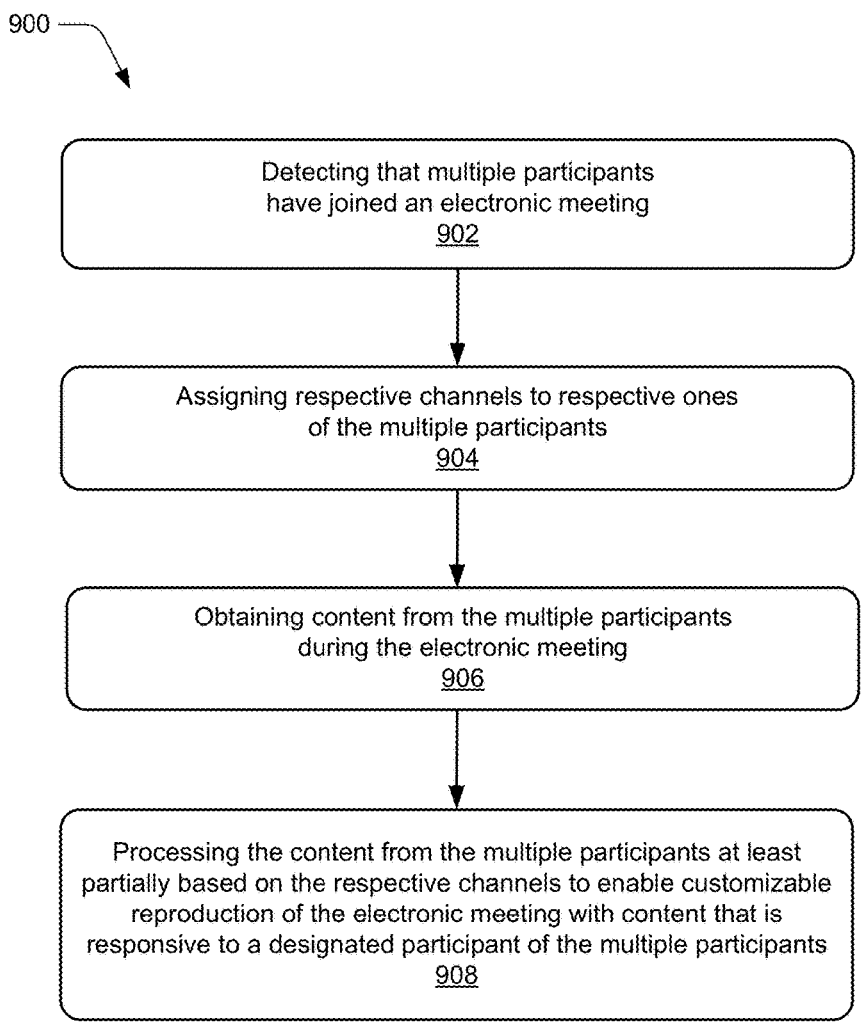
FIG. 9 is a flow diagram depicting an example procedure in accordance with one or more example embodiments.

FIG. 9 depicts an example procedure 900 in which an electronic meeting is managed so that content may be processed to enable a customized reproduction of the electronic meeting. A joining of an electronic meeting by multiple participants is detected (block 902). For example, an electronic meeting module 110 may detect that multiple participants 114 have registered to participate in an electronic meeting 108 using multiple end-user devices 104. To do so, electronic meeting module 110 may receive an individualized URL from an end-user program 116, such as a browser, or may validate an individualized access code received from an end-user program 116 that is executing on a phone.

Respective channels are assigned to respective ones of multiple participants (block 904). For example, an electronic meeting module 110 assigns a channel 304 that is associated with a participant 114 to serve as a repository or categorization for content 204 that is contributed by the associated participant. To do so, electronic meeting module 110 may assign a respective unique identifier 314 that corresponds to a respective participant 114 to a respective channel 304. Content from multiple participants may be obtained during an electronic meeting (block 906). For example, an electronic meeting module 110 may acquire content 204, such as audio or video or chat or slides, from presenter or non-presenter participants 114 during an electronic meeting 108. To do so, electronic meeting module 110 may receive at a server device 102 internet protocol (IP) packets from end-user devices 104 via a network 106 for inclusion in an electronic meeting memorialization 202.

Content from multiple participants is processed at least partially based on respective channels to enable customizable reproduction of an electronic meeting with content that is responsive to a designated participant of the multiple participants (block 908). For example, an electronic meeting module 110 may direct content 204 that is obtained from a respective participant 114 to a respective channel 304 that is associated with the respective participant 114, with channel 304 or participant 114 corresponding to a unique identifier 314, such that content 204 contributed by at least one designated participant 114 may be selected for inclusion or exclusion so as to customize a reproduction of an electronic meeting 108. To do so, electronic meeting module 110 may associate incoming content 204 with a unique identifier 314, may store content 204 in a memory silo 408 that is associated with a unique identifier 314, some combination thereof, and so forth. Additionally or alternatively, content 204, such as a discretized content event 404, may be associated 414 with a time stamp 406($t$) to facilitate presentation of content event 404 at an appropriate time index 402 during a customized reproduction of an electronic meeting 108.

Figure 10:
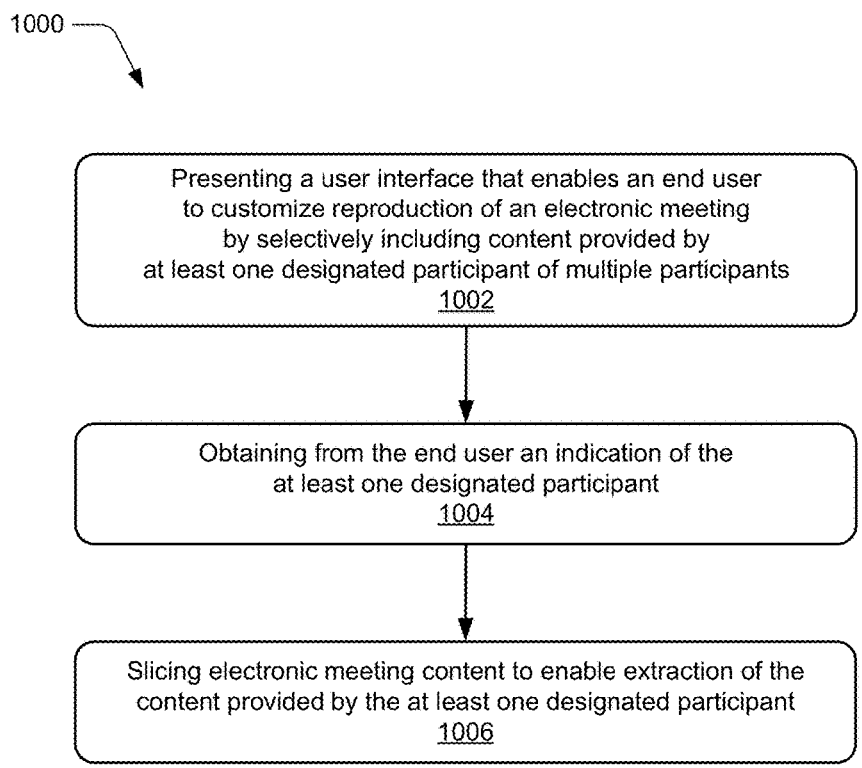
FIG. 10 is another flow diagram depicting another example procedure in accordance with one or more example embodiments.

FIG. 10 depicts an example procedure 1000 in which a user may be empowered to customize content for reproduction of an electronic meeting. A user interface that enables an end user to customize reproduction of an electronic meeting by selectively including content provided by at least one designated participant of multiple participants is presented (block 1002). For example, an electronic meeting module 110 may cause to be displayed a user interface 800 that enables an end-user, such as a host or a presenter participant, to designate a participant 114 by selecting a participant row 814 so that content 204 contributed by the designated participant is included as part of a reproduction of an electronic meeting 108. To do so, electronic meeting module 110 may send instructions, such as web page coding, from a server device 102 to an end-user device 104 to cause end-user device 104 to display a user interface 800 that has selectable zones, such as (i) an include/exclude column 804 with user interface items for designating participant rows 814, (ii) time slot columns 806, (iii) individual blocks 808 or 810, a combination thereof, and so forth.

An indication of at least one designated participant is obtained from an end-user (block 1004). For example, an electronic meeting module 110 may receive via a transmission over a network 106 a selection indicative that content 204 provided by a particular participant 114 has been designated for inclusion or exclusion in a reproduction of an electronic meeting 108. To do so, electronic meeting module 110 may analyze a signal received from an application executing on an end-user device 104, with the signal corresponding to selection of a user interface button representative of a particular non-presenter participant 114.

Electronic meeting content is sliced to enable extraction of content provided by at least one designated participant (block 1006). For example, an electronic meeting module 110 may slice content 204 of an electronic meeting 108 at least on a per-participant-channel basis so that content 204 contributed by a particular participant 114 may be separated from an electronic meeting memorialization 202 such that content 204 from a particular participant 114 may be played back independently of content 204 provided by other participants 114. To do so, electronic meeting module 110 may store incoming content 204 in different memory silos 408 that are respectively associated with different participants; may, during an electronic meeting, associate incoming content 204 with a unique identifier 314 that corresponds to a participant that contributed the content; may, after an electronic meeting, isolate content 204 that is associated with a particular designated participant 114 responsive to a designation of the particular designated participant; may identify or forward, for current or future presentation as part of a reproduction, content 204 that is associated with a unique identifier 314 that corresponds to a designated participant 114; some combination thereof; and so forth.

Figure 11:
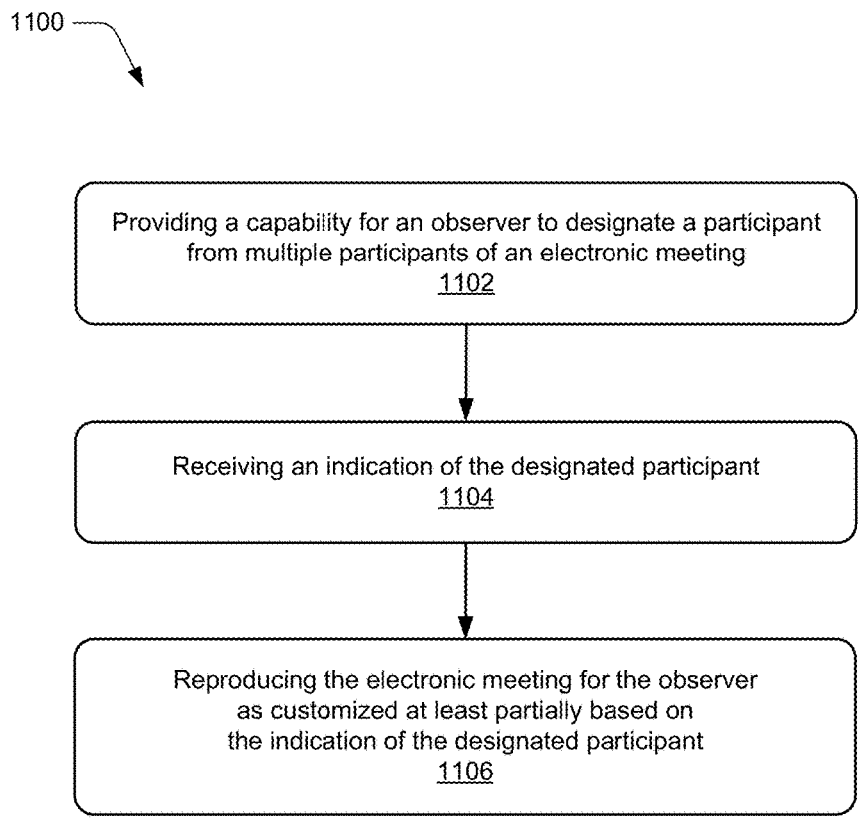
FIG. 11 is yet another flow diagram depicting yet another example procedure in accordance with one or more example embodiments.

FIG. 11 depicts an example procedure 1100 in which an electronic meeting is reproduced in accordance with a customization indication. A capability for an observer to designate a participant from multiple participants of an electronic meeting is provided (block 1102). For example, an electronic meeting module 110 may cause a user interface 800 to be displayed on a screen so that a user who wishes to observe an electronic meeting 108 that was attended by multiple participants 114 may designate one or more participants 114 that are of interest to the observing user. To do so, electronic meeting module 110 may send one or more signals to at least one end-user device 104, with the signals including at least data for at least a portion of user interface 800, and with the data including at least a representation of multiple participants 114, such as names, job titles, email addresses, associated business division, a combination thereof, and so forth. The user interface may enable a would-be observer to select for inclusion in or exclusion from a customized reproduction of electronic meeting content contributed by multiple participants on a per-participant basis. The user interface may include an indication (e.g., an icon, a character, a shading, a highlighting, or a combination thereof) to a would-be observer of when (e.g., a time slot at which) a given participant of multiple participants contributes content to an electronic meeting.

An indication of a designated participant is received (block 1104). For example, an electronic meeting module 110 may receive a signal identifying a participant 114 by name or other identifier responsive to a user input detected at an end-user device 104. To do so, an electronic meeting module 110 of a server device 102 may be in communication with an end-user program 116, which detects user input by a would-be observer at an end-user device 104 with the user input signifying that a particular participant is requested by the would-be observer to be included or excluded.

An electronic meeting is reproduced for an observer as customized at least partially based on an indication of a designated participant (block 1106). For example, an electronic meeting module 110 may reproduce (e.g., create, playback, generate a version of, or combination thereof) a previously-conducted electronic meeting 108 for a user that wishes to view or listen to the electronic meeting as modified by selectively including or excluding content 204 provided by a designated participant 114. To do so, electronic meeting module 110 may create a complete file (e.g., an mp3 or mp4) of a customized electronic meeting reproduction, stream a presentation of a customized electronic meeting reproduction for real-time playback, and so forth that includes or excludes content associated with a unique identifier 314 that corresponds to a participant 114 that is designated by a would-be observer. For instance, responsive to a received indication to include a designated participant, an electronic meeting may be reproduced using content from a channel that is associated with the designated participant; alternatively, responsive to a received indication to exclude a designated participant, an electronic meeting may be reproduced without using content from a channel that is associated with the designated participant.

Figure 12:
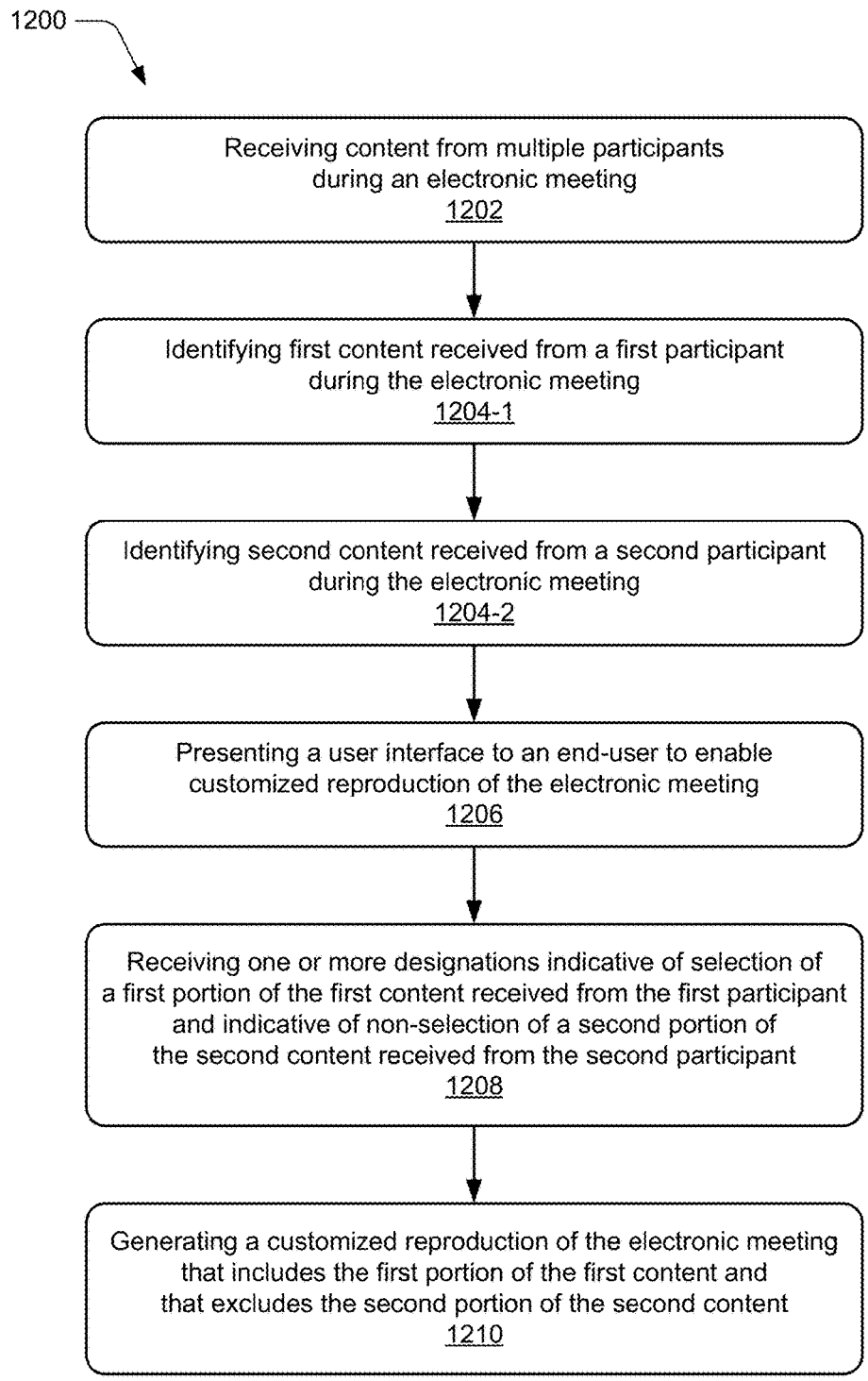
FIG. 12 is still yet another flow diagram depicting still yet another example procedure in accordance with one or more example embodiments.

FIG. 12 depicts an example procedure 1200 in which an electronic meeting is at least partially conducted and a customized reproduction thereof is generated using selected portions of content. Content from multiple participants is received during an electronic meeting (block 1202). For example, content 204 may be received from multiple participants 114 during an electronic meeting 108. To do so, an electronic meeting module 110 may collect content 204 as part of an electronic meeting memorialization 202.

First content that is received from a first participant during the electronic meeting is identified (block 1204-1). For example, first content 204(1) that is received from a first participant 114(1) during an electronic meeting 108 may be identified. To do so, electronic meeting module 110 may associate first content 204(1) with a first unique identifier 314(1) or assign first content 204(1) to a first channel 304(1), with first unique identifier 314(1) or first channel 304(1) corresponding to first participant 114(1).

Second content that is received from a second participant during the electronic meeting is identified (block 1204-2). For example, second content 204(2) that is received from a second participant 114(2) during an electronic meeting 108 may be identified. To do so, electronic meeting module 110 may associate second content 204(2) with a second unique identifier 314(2) or assign second content 204(2) to a second channel 304(2), with second unique identifier 314(2) or second channel 304(2) corresponding to second participant 114(2).

A user interface is presented to an end-user to enable customized reproduction of the electronic meeting (block 1206). For example, a user interface 800 may be presented to an end-user, such as a host or a participant or a would-be observer, with user interface features enabling customization of a reproduction of electronic meeting 108. To do so, electronic meeting module 110 may send instructions—such as code or application commands—to an end-user device 104 to render a user interface 800 that enables contributed content 204 to be designated for inclusion or exclusion in a recorded version of electronic meeting 108 that is to be generated.

One or more designations are received that are (i) indicative of selection of a first portion of the first content as received from the first participant and (ii) indicative of non-selection of a second portion of the second content as received from the second participant (block 1208). For example, a designation of one or more blocks corresponding to first content 204(1) of a participant row 814 corresponding to first participant 114(1), including up to an entirety thereof, may be received. Similarly, a designation of one or more blocks corresponding to second content 204(2) of a different participant row 814 corresponding to second participant 114(2), including up to an entirety thereof, may be received. To do so, a user interface 800 may detect selection—such as a mouse click or a finger touch—of a channel for inclusion or exclusion, of individual time slot blocks (e.g., block 808 or 810) for inclusion or exclusion, a combination thereof, and so forth.

A customized reproduction of the electronic meeting is generated that includes the first portion of the first content and that excludes the second portion of the second content (block 1210). For example, a tailored version of electronic meeting 108 may be created that presents a selected part of first content 204(1) but fails to present a non-selected part of second content 204(2). To do so, electronic meeting module 110 may stream a video or enable downloading of a file that encodes selected time slots of first content 204(1) of first participant 114(1) (e.g., that encodes the highlighted blocks of Jessica's channel in FIG. 8) but omits non-selected time slots of second content 204(2) of second participant 114(2)

(e.g., that omits content, if any, of the non-highlighted block 810 of Donald's channel or all blocks of Anika's channel as shown in FIG. 8).

Having described example procedures in accordance with one or more embodiments, consider now an example system and device that can be utilized to implement the various techniques described herein.

Example System and Device

Figure 13:
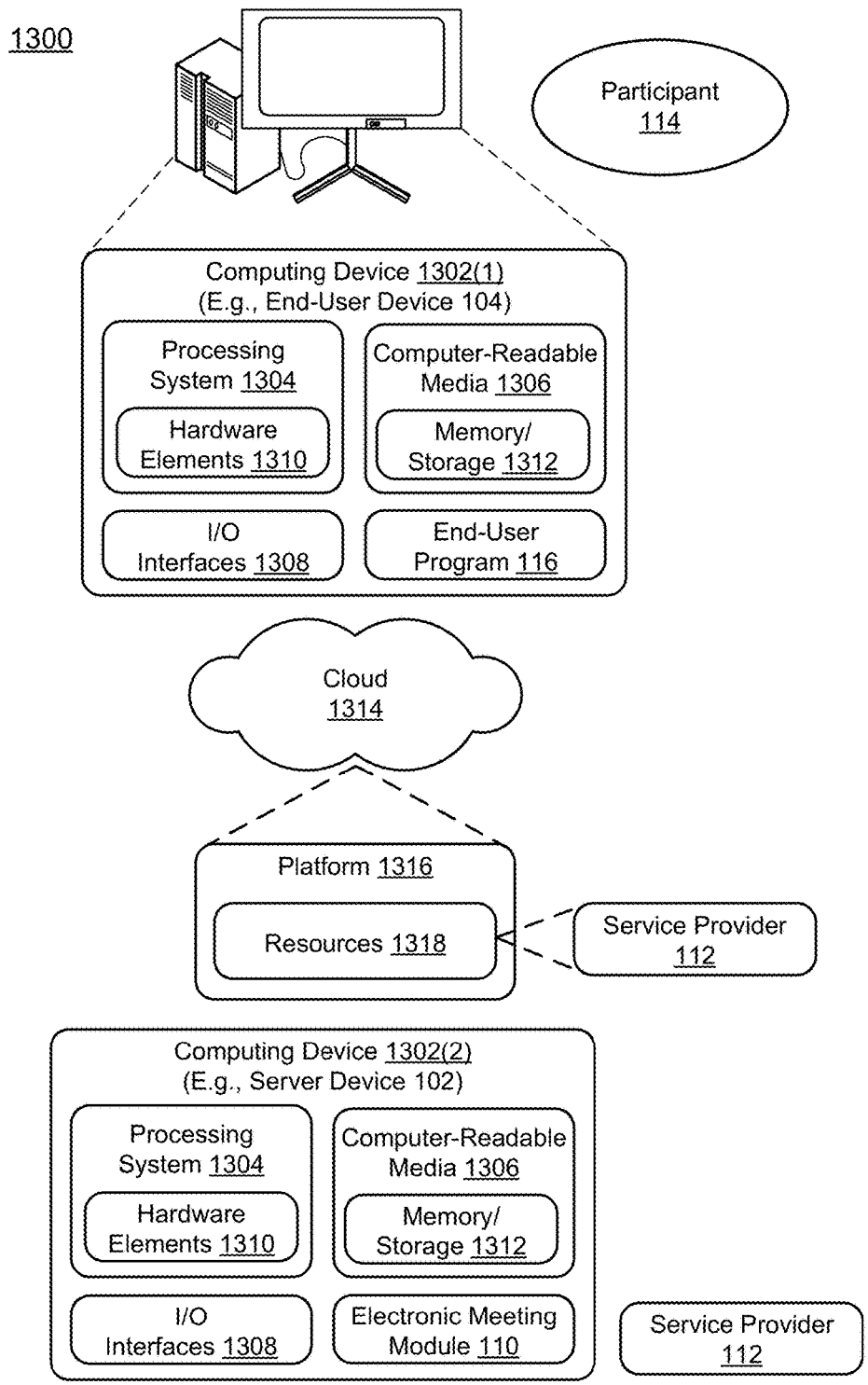
FIG. 13 illustrates an example system including various components of an example device that can be employed for one or more embodiments of customizable reproduction of electronic meetings as described herein.

FIG. 13 illustrates an example system generally at 1300 that includes example computing devices 1302 that are representative of one or more computing systems and/or devices that may implement the various techniques described herein. This is illustrated through inclusion of an electronic meeting module 110, which may operate as described herein above. A computing device 1302 may comprise, for example, a server device 102 (e.g., as represented by computing device 1302(2)) of a service provider 112, an end-user device 104 (e.g., as represented by computing device 1302(1)) such as a client device that is associated with a participant 114, an on-chip system or system-on-a-chip (SOC), or any other suitable computing device or computing system. Although not explicitly illustrated in FIG. 13, an electronic meeting module 110 may additionally or alternatively be located at and executing on a computing device 1302(1).

The example computing device 1302 as illustrated includes a processing system 1304, one or more computer-readable media 1306, and one or more I/O interfaces 1308 that may be communicatively coupled, one to another. Although not explicitly shown, the computing device 1302 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit (ASIC) or other logic device formed using e.g. one or more semiconductors. The hardware elements 1310 are not limited by the materials from which they are formed or the processing mechanisms employed therein. For example, processors may be comprised of semiconductor(s) or transistors (e.g., electronic integrated circuits (ICs)). In such a context, processor-executable instructions may comprise electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) or nonvolatile media (such as read only memory (ROM), Flash memory, optical discs, magnetic disks, and so forth). The memory/storage component 1312 may include fixed media (e.g., RAM, ROM, or a fixed hard drive) or removable media (e.g., Flash memory, a removable hard drive, or an optical disc). The computer-readable media 1306 may be configured in a variety of other ways as further described below.

Input/output interface(s) 1308 are representative of functionality to allow a user to enter commands or information to computing device 1302 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors that are configured to detect physical touch), a camera (e.g., which may employ visible or non-visible wavelengths such as infrared frequencies to recognize movement as gestures that need not involve touch), a combination thereof, and so forth. Examples of output devices include a display device (e.g., an LCD or LED screen, a monitor, or a projector), a speaker, a printer, a network card, a haptic-response device, a combination thereof, and so forth. Thus, the computing device 1302 may be configured in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media may include a variety of media that may be accessed by the computing device 1302. By way of example, and not limitation, computer-readable media may include "computer-readable storage media" and "computer-readable signal media." "Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a method or technology suitable for storage of information, such as computer readable instructions, data structures, program modules, logic elements/circuits, or other data. Examples of computer-readable storage media may include, but are not limited to, RAM, ROM, EEPROM, flash memory, other e.g. solid state memory technology, CD-ROM, digital versatile discs (DVD) or other optical storage, hard disks, magnetic cassettes, magnetic tape, magnetic disk storage or other magnetic storage devices, or other storage device, tangible media, article of manufacture, or combination thereof that is suitable to store desired information and that may be accessed by a computer. "Computer-readable signal media," as used herein, refers to a signal-bearing medium that is configured to transmit instructions to hardware of the computing device 1302, such as via a network. Computer-readable signal media typically may embody computer readable instructions, data structures, program modules, or other data in a modulated data signal, such as carrier waves, data signals, or other transport mechanism. Computer-readable signal media may also include any information delivery media. The term "modulated data signal" means a signal that has one or more of its characteristics set or changed in such a manner as to encode information in the signal. By way of example, but not limitation, computer-readable signal media may include wired media, such as a wired network or direct-wired connection, and wireless media such as acoustic, RF, microwave, infrared, and other wireless media.

As previously described, hardware elements 1310 and computer-readable media 1306 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1310. The computing device 1302 may be configured to implement particular instructions or functions corresponding to software or hardware modules. Accordingly, implementation of a module that is executable by the computing device 1302 as software may be achieved at least partially in hardware, e.g., through use of computer-readable storage media or the hardware elements 1310 of the processing system 1304. The instructions or functions may be executable/operable by one or more articles of manufacture (e.g., one or more computing devices 1302 or processing systems 1304) to implement techniques, modules, or examples described herein.

The techniques described herein may be supported by various configurations of the computing device 1302 and are not limited to the specific aspects of the example devices described herein. This functionality may also be implemented fully or partially through use of a distributed system, such as over a "cloud" 1314 via a platform 1316 as described below.

The cloud 1314 may include or represent a platform 1316 for resources 1318. The platform 1316 abstracts underlying functionality of hardware (e.g., servers or data centers) and software resources of the cloud 1314. The resources 1318 may include applications or data that can be utilized while computer processing is executed on servers that are remote from, or distributed around, the computing device 1302. Resources 1318 may also include services provided over the Internet or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300, or at least throughout the cloud 1314 as well as a server device 102 implementation of the computing device 1302. For example, functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device comprising:
   one or more processors; and
   a computer-readable storage medium having stored thereon multiple instructions that, responsive to execution by the one or more processors, cause the one or more processors to perform operations comprising:
      receiving content from multiple participant users during an electronic meeting, the content comprising audio content and non-audio content, the audio content and the non-audio content including event identifiers of events occurring during the audio content and the non-audio content;
      identifying a first item of the content received from a first participant user during the electronic meeting, the first item of the content including the audio content and the non-audio content;
      identifying a second item of the content received from a second participant user during the electronic meeting, the second item of the content including the audio content;
      presenting a user interface to an end-user to enable customized reproduction of the electronic meeting, the user interface displaying the event identifiers occurring during the content;
      receiving one or more designations indicative of selection of a first portion of the first item of the content indicated by one of the event identifiers occurring during the audio content or the non-audio content, the one or more designations received from the first participant user and indicative of non-selection of a second portion of the second item of the content received from the second participant user; and
      responsive to the receiving of the one or more designations, automatically encoding, by the device, the first portion of the first item of the content without encoding the second portion of the second item of the content to generate a customized reproduction of the electronic meeting that includes the first portion of the first item of the content and that excludes the second portion of the second item of the content.

2. A device as described in claim 1, wherein:
   the identifying the first item of the content operation comprises receiving the first item of the content from the first participant user at a particular time slot during the electronic meeting; and
   the identifying the second item of the content operation comprises receiving the second item of the content from the second participant user at the particular time slot during the electronic meeting.

3. A device as described in claim 1, wherein the first participant user comprises a presenter participant user, and the first portion comprises an entirety of the first item of the content.

4. A device as described in claim 1, wherein the identifying the first item of the content operation comprises:
  receiving the first item of the content from the first participant user during the electronic meeting;
  assigning a first participant identifier to the first participant user; and
  slicing the content from the multiple participant users by, at least partially, associating the first participant identifier to the first item of the content.

5. A device as described in claim 4, wherein the identifying the first item of the content operation further comprises slicing the content from the multiple participant users by, at least partially, categorizing the first item of the content into structured integrated events and unstructured external events.

6. A device as described in claim 1, wherein the presenting the user interface operation comprises generating the user interface, the user interface comprising a grid of elapsed time versus individual ones of the multiple participant users with an intersection of a given participant user of the multiple participant users and a particular time slot of the elapsed time including a representation of any content contributed by the given participant user during the particular time slot.

7. A device as described in claim 6, wherein the generating comprises generating the grid of the user interface to be indicative of which content is selected for inclusion or which content is not selected for inclusion in the customized reproduction of the electronic meeting.

8. A computer-implemented method comprising:
  detecting that multiple participant users have joined an electronic meeting;
  assigning respective channels to respective ones of the multiple participant users;
  obtaining content from the multiple participant users during the electronic meeting, the content comprising audio content and non-audio content, the audio content and the non-audio content including event identifiers of events occurring during the audio content and the non-audio content;
  processing the content from the multiple participant users to assign the content obtained from the multiple participant users to the assigned respective channels of the multiple participant users, the content obtained from one of the multiple participant users including the audio content and the non-audio content and the content obtained from additional participant users of the multiple participant users including the audio content; and
  responsive to receiving a designation of a participant user of the multiple participant users and one of the event identifiers, automatically encoding content assigned to a channel of the designated participant user based on a location in the content of the one event identifier without encoding content assigned to a channel of at least one of the other multiple participant users to generate a customized reproduction of the electronic meeting that includes the content assigned to the channel of the designated participant user and excludes the content assigned to the channel of the at least one other multiple participant users.

9. A computer-implemented method as described in claim 8, wherein each channel of the respective channels comprises a participant identifier of multiple participant identifiers; and wherein the assigning comprises:
  assigning a different participant identifier of the multiple participant identifiers to each participant user of the multiple participant users.

10. A computer-implemented method as described in claim 9, wherein the processing comprises:
  storing the content from respective ones of the multiple participant users in association with respective ones of multiple participant identifiers.

11. A computer-implemented method as described in claim 10, wherein the storing comprises:
  storing a participant identifier of the multiple participant identifiers in association with content obtained from a participant user that corresponds to the participant identifier.

12. A computer-implemented method as described in claim 10, wherein the storing comprises:
  storing, in a memory silo that is associated with a participant identifier of the multiple participant identifiers, content obtained from a participant user that corresponds to the participant identifier.

13. A computer-implemented method as described in claim 8, wherein the processing comprises:
  storing the content in association with a time index that is representative of elapsed time of the electronic meeting.

14. A device comprising:
  one or more processors; and
  a computer-readable storage medium having stored thereon multiple instructions that, responsive to execution by the one or more processors, cause the one or more processors to implement an electronic meeting module configured to perform operations comprising:
    presenting a user interface that enables an end user to customize reproduction of an electronic meeting by selectively including content provided by at least one participant user of multiple participant users, the content comprising audio content and non-audio content, the audio content and the non-audio content including event identifiers of events occurring during the audio content and the non-audio content;
    obtaining from the end user a designation of the at least one participant user and one of the event identifiers of either the audio content or the non-audio content; and
    automatically encoding the content provided by the at least one participant user to generate a customized reproduction of the electronic meeting by:
      slicing electronic meeting content based on a location in the content of the one event identifier to enable extraction of both the audio content and the non-audio content provided by the at least one designated participant user from the location; and
      filtering out content provided by another participant user that is not designated by the end user.

15. A device as described in claim 14, wherein the at least one participant user includes a presenter participant user and a first non-presenter participant user, but excludes a second non-presenter participant user.

16. A device as described in claim 14, wherein the slicing comprises identifying the content provided by the at least one participant user at least partially based on a participant identifier corresponding to the at least one participant user.

17. A device as described in claim 14, wherein the operations further comprise filtering out content provided by multiple additional participant users that are not designated by the end user.

18. A device as described in claim 14, wherein the operations further comprise:

slicing the electronic meeting content temporally to enable selective inclusion or exclusion of a portion of the electronic meeting content on a temporal basis; and obtaining from the end user a temporal indication of some content that is to be omitted from the reproduction of the electronic meeting.

19. A device as described in claim 18, wherein the slicing the electronic meeting content temporally comprises slicing the electronic meeting content by time slot or by content event.

20. A device as described in claim 14, wherein the slicing comprises channelizing the electronic meeting content into respective channels that are associated with respective participant users of the multiple participant users based at least partially on respective participant identifiers that correspond to the respective participant users.

* * * * *